United States Patent Office 3,621,851
Patented Nov. 23, 1971

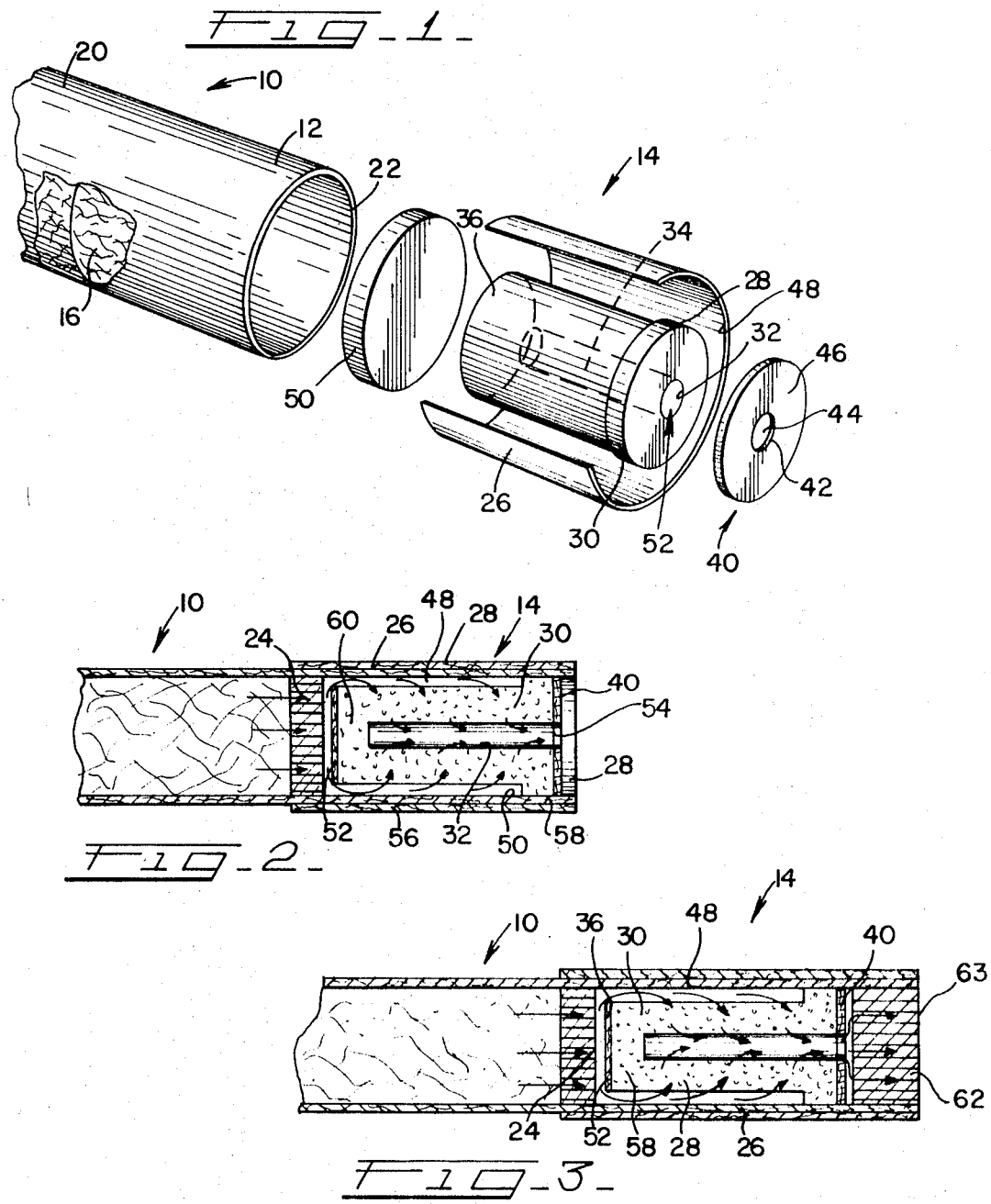

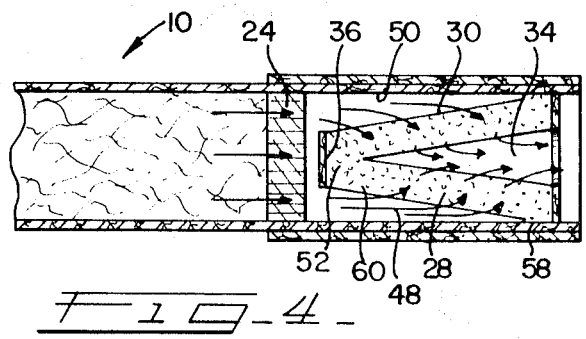
FIG-4-
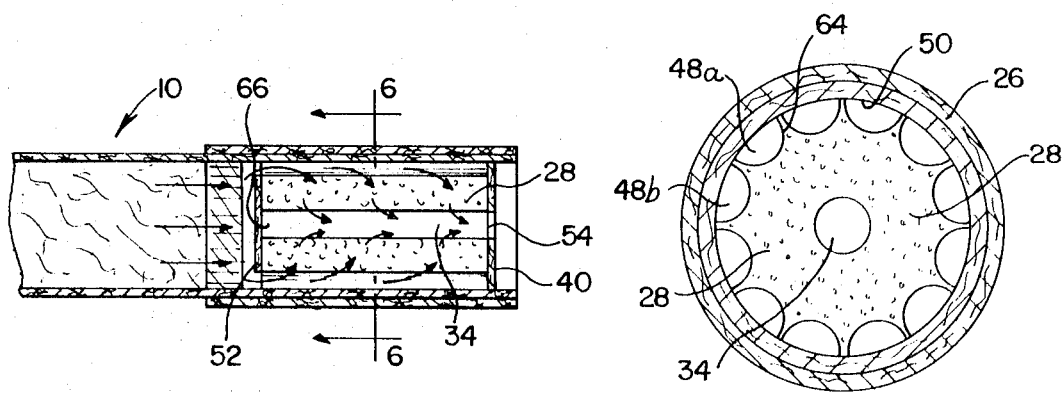
FIG-5-     FIG-6-
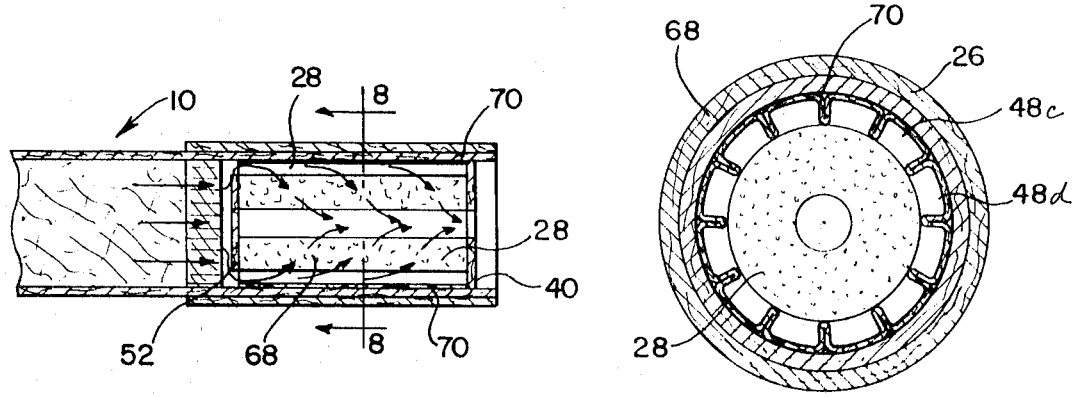
FIG-7-     FIG-8-

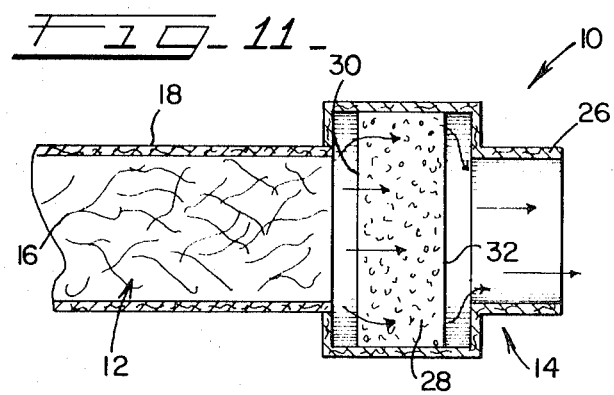
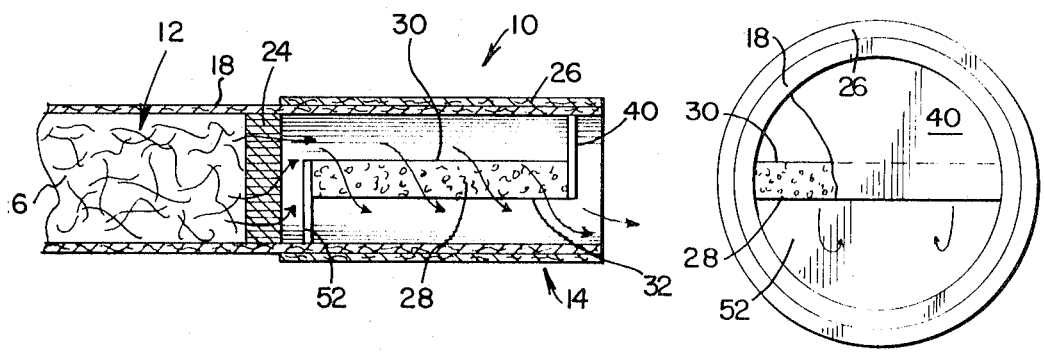
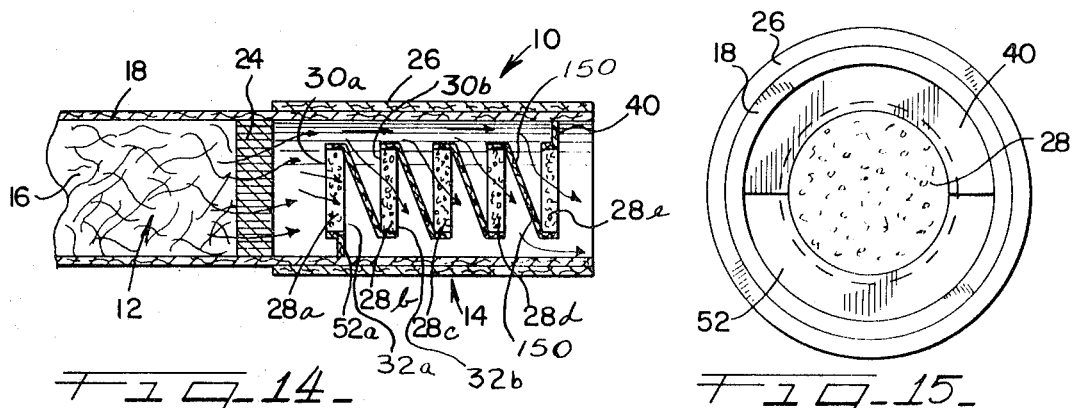

3,621,851
FILTER FOR SMOKER'S ARTICLE
Donald E. Heskett, Villa Park, and John B. Heskett, Lombard, Ill., assignors to Kata Manufacturing & Filtering Co.
Continuation-in-part of applications Ser. No. 490,802, Sept. 28, 1965, and Ser. No. 581,507, Sept. 23, 1966. This application Nov. 26, 1969, Ser. No. 880,109
The portion of the term of the patent subsequent to Nov. 3, 1987, has been disclaimed
Int. Cl. A24b 15/02; A24d 1/06; A24f 1/08
U.S. Cl. 131—10.5
30 Claims

ABSTRACT OF THE DISCLOSURE

A cigarette or cigar filter assembly having a large entry surface area in respect to its volume and characterized by low pressure drop, high effectiveness, and a simple configuration which is adapted to economical mass production. The body of the filter assembly is made from a bed of filter material, preferably aggregate particles which are bound by a minor proportion of resinous binder material into a fixed relation to one another. The body, in spite of having significant structural rigidity, and a density substantially equal to the density of the active aggregate material alone in its loose bed or uncompacted form, characterized by a low pressure drop thereacross, and the aggregate material, in a preferred embodiment, is bound so as to have substantially none of its activity impaired by the binder. Smoke flow through the axial ends of the filter body itself is blocked off so that smoke enters the filter body around the large entry surface presented by the outer surface of the filter body, passes radially through the filter body, and is drawn through the opening lying at one end of the core and facing to the rear of the body. Preferably, the filter assembly comprises an outer cylinder forming the mouthpiece and an inner filter body in the form of a hollow body. An annular smoke chamber is defined between the outer surface of the body, the entry portion of the body, and inner surface of the mouthpiece, and the center or core of the body opens to the rear of the body. The method of manufacture of the filter body is easily adapted to extrusion or like continuous manufacture, as well as batch method manufacure. Preferred filter materials include activated charcoal and ion exchange resins in finely divided form. The entire filter assembly is preferably of the same cross-sectional area and configuration as the end of the cigarette, while the filter body itself is of reduced diameter in respect to the cigarette diameter. In some embodiments, the advantages of effective filtration and low pressure drop are achieved with the use of filter materials which need not be surface, or otherwise, active provided they are arranged to provide a flow pattern in accordance with this invention.

BACKGROUND AND DESCRIPTION OF THE INVENTION

This application is a continuation-in-part of our copending application Ser. No. 581,507, filed Sept. 23, 1966, now U.S. Pat. No. 3,538,020 which, in turn, was a continuation-in-part of our then copending application Ser. No. 490,802, filed Sept. 28, 1965, now abandoned.

The present invention relates to filter assemblies and, in particular, to filters which are advantageously used with smoker's articles such as cigarettes, cigars, pipes, and the like. More particularly, the invention relates to smoke filters of low pressure drop and which have the filter bodies made from a bed of particles which are closely held together in fixed relation to each other and which have densities approximately equal to the densities of the active material alone in loose bed or uncompacted form.

Filters made in accordance with a preferred embodiment of the invention are constructed and arranged so as to provide a maximum amount of available activity within a given volume of the filter body and are shaped so that smoke passing therethrough is exposed to a large entry surface area of the filter, but passes through only a thin section of the filter body. Therefore, the pressure drop across the filter body as used is relatively low, although the material per se which comprises the filter body may be of relatively low porosity.

In the prior art it has been generally well established that it is theoretically possible to eliminate many, if not all, of the solid as well as the gaseous and liquid particles from the smoke of tobacco or other vegetal smoking materials by means of a suitable filtration system. Removal of at least some, and preferably a major portion, of these particles as well as all of the harmful gases is desirable since it is almost conclusively established that many of these particles and gases are harmful to health in one way or another. However, in the case of cigarette filters, there has been a problem not only in the selection of filter material which will remove those components desired to be eliminated from the smoke while allowing other particles to remain in the fluid stream, but also in the fact that there has always been an undesirably high pressure drop across a filter bed of materials which are effective to remove these smoke components. Since smoking a cigarette or cigar is largely a matter of personal preference or habit, it is ordinarily necessary that this pressure drop be held within certain limits since most smokers do not prefer a cigarette having pressure drop thereacross while is significantly higher than that of the pressure drop across an unfiltered cigarette.

A problem with prior art filters, in general, is that they have insufficient active material in reasonable filter body volumes, or, if they do contain sufficient active material to be effective, they have been characterized either by closely packed beds of aggregate material which cause high pressure drop, or by loose, mobile particules which are susceptible to bed packing under vacuum and which therefore cause increased pressure drop or eventual clogging with use. In addition, if the particles are loose, upon compression occasioned by grasping the cigarette, particles formerly trapped in the filter are squeezed out and released into an area downstream of the filter.

In particular, in some prior are cigarette filters, loose bed filter media have been used, which present a problem of packing (compaction) due to settling of particle in use and/or transport and handling. Compaction of the loose bed filter media results in higher pressure drops and very often to channeling which renders a substantial portion of the filter media inaccessible to the fluid. To overcome compaction problems, larger particle filter media have been used, which have lower apparent surface area and consequently lower dynamic capacity per unit weight of filter media. Since the critical bed depth of absorptive media increases with increase of particle size of the filter media, larger bed volumes have been used, although even this expedient has not provided fully satisfactory filtration results.

In some other prior art cigarette filters attempts have been made to solve some of the problems of loose bed large and fine particles filters through bonding techniques, but none provides for optimum utilization of the filter media per unit volume of filter.

Many filter materials which are desirable from a theoretical standpoint for use with smoke have been unable to be used in cigarettes or cigars because no way is known of forming them into a relatively high density, highly active bed wherein the particles are fixed in relation to one another, and also wherein exposure of substantially all of the surface area of the material to the fluid stream is made possible.

Another drawback of known cigarette filters is that since mass production is required for economy, filters have tended to assume generally the same configuration, usually that of a cylinder which is circular or elliptical in cross section, or various conical, frusto-conical, and related solid shapes, and these shapes have certain inherent disadvantages.

Referring now to excessive pressure drop across an effective cigarette filter, this problem has heretofore appeared to have been an inherent characteristic of effective filters. That is, since it is a general principle of surface active filtration that a certain surface area must be present to remove a given amount of suspended material and gases from a given amount of fluid, and since a filter bed with fine particle size presents a larger surface area for a given volume, small particle size is indicated if the overall size of the filter is to be kept within reason. The use of small particle aggregates in a filter bed, for example, particles in the order of 50 mesh (U.S. Standard Sieve Series) and smaller, as opposed to larger aggregate particles, has been rejected by commercial cigarette manufacturers even though such particles exhibit substantially greater surface area and therefore more potential effectiveness for a given amount of aggregate material. Reasons for this rejection have generally been based on the increased pressure drops incurred with such fine particle size aggregates. These pressure drops have generally resulted from the aggregate particles compacting against each other during use as well as against the retaining device which by necessity must be of a porosity such that it will retain the smallest size aggregate particles in the loose bed. In general, prior art efforts to bind these aggregate particles and thereby avoid compacting have likewise been unsatisfactory since they have resulted in unavailability of substantial portions of the surface area of the aggregate particles due to the covering thereof by the binder material. As a result of the above considerations, it is now standard practice to pass cigarette smoke through a filter bed volume defined by the approximate cross-sectional area of the cigarette and a reasonable axial length. Naturally, any volume so arranged has substantial thickness in the direction of smoke passage. Since pressure drop is proportional to the length of filter material, assuming a constant, predetermined filter density, filters of an effective length suffer from a pressure drop which is at least noticeable and usually objectionable to the ordinary smoker. Cigarette filters having lower pressure drops are generally not actually very effective as filters, and as a result, present day cigarette filtration is a relatively unfortunate compromise between acceptable pressure drop and filter effectiveness.

In the present invention, a filter bed material made according to the methods described above and having the shape and characteristics to be herein described has proved to be highly effective in removing contaminants of many kinds, dependent only on the type of filter bed material used, while exhibiting a pressure drop across the filter bed of such a low order that, even with a filter, a cigarette does not exhibit a noticeably greater pressure drop than the same or similar type or brand of cigarette without a filter.

Accordingly, in view of the shortcomings of prior art cigarette or other smoke or gas filters, one object of the present invention is to provide an improved cigarette, cigar or like smoke filter.

Another object of the invention is to provide a cigarette or cigar filter having an extremely low pressure drop thereacross when compared to prior art filters of equal effectiveness.

Another object of the present invention is to provide a cigarette or cigar filter of substantially improved effectiveness. In this regard, an important aspect of this invention concerns the effective utilization of fine particle size aggregate in filter bodies.

A further object is to provide a filter material and method of manufacturing the same which is particularly adapted for use in making cigarette, cigar or other smoke filters.

Still another object is to provide a cigarette filter or the like wherein the active aggregate of the filter body used for treatment is held in place against spatial movement with respect to each other.

Still another object is to provide a cigarette filter having significant structural strength so as to prevent undesired crushing thereof with resultant passage through the filter of previously trapped material.

Another object of the invention is to provide a cigarette filter having a configuration which is easily and readily adaptable to economical manufacture.

Still another object is to provide a cigarette filter in which the portion which comprises the filter bed or element is in the form of a sleeve or the like adapted to receive means thereover for defining an outer, smoke-impermeable chamber lying radially outwardly of the filter element and defining a passage for receiving smoke before it passes through the filter.

Another object is to provide a filter cigarette in which the filter is of relatively large surface area in relation to the cross-sectional end area of the cigarette and of a thin radial cross section.

Another object is to provide a cigarette filter in which a generally cylindrical, hollow filter element or body having radially inner and outer surfaces is held within an exterior sleeve and in which smoke passes radially inwardly of the element from the outer surface thereof into a center region lying radially inwardly of the inner surface of the element.

Another object is to provide a cigarette and filter therefor in which the filter element is arranged so that smoke passes from a chamber inside the mouthpiece and communicating with the body of the cigarette through a hollow cylindrical filter sleeve to an outlet passage on one axial end of the cylindrical sleeve.

Another object is to provide a filter body construction in which synthetic resinous or like binders may be used to hold aggregate particles of varying types and kinds in a desired relatively rigid structural shape.

Another object is to provide a cigarette filter which is characterized by extremely low pressure drop, but comprises a large plurality of extremely finely sub-divided aggregate particles, substantially all of the surface of all such particles being exposed for fluid treatment although the filter body itself has a strong, rigid structure.

Still another object is to provide a filter body comprised of a binder and a mass of finely sub-divided particles, in which only a very small proportion of the interstitial volume of the body is taken up by the binder material.

Another object is to provide an improved filter cigarette, particularly a filter cigarette characterized by a radial smoke flow pattern through the filter body.

The present invention achieves these objects, and others which are inherent therein, by providing a cigarette filter which includes a filter body comprised of a large plurality of finely divided aggregate particles bound into a substantially rigid body in which the particles are fixed in relation to one another and have substantially their entire surface areas freely exposed for contact with fluid passing through the filter, and in which the filter body is disposed within a relatively smoke-impermeable mouthpiece and has a configuration such that the entry surface area presented to a smoke stream passing therethrough is substantially in excess of the cross-sectional end area of the cigarette or cigar with which the filter is associated. The preferred filter materials are active adsorptive materials such as carbon, ion exchange resins, as well as other materials, both known and which may be discovered in the future, which exhibit properties making them suitable for smoke treatment and filtration.

The filter bodies are preferably formed by combining the reactants with the active material and allowing the reaction producing the binder to take place under controlled conditions within a mold or extrusion tube. In this manner, the active particles are trapped and held in place in a fixed spatial relation to one another to form a structurally rigid body, while an insignificant amount of the active surface area of the filter body material is unavailable for use as a result of being covered with the binder material. Since surface area and filter thickness are factors in pressure drop, the invention is directed not only to filters for cigarettes and other smoker's articles having particular chemical and physical properties and composition, but also, in the preferred embodiments thereof, to filters for such articles having particular structural shapes, configurations, and flow patterns.

The exact manner in which this invention achieves these objects, and others which are inherent therein, will become more apparent when reference is made to the following detailed description of the preferred embodiments of the invention and to the accompanying drawings in which like reference numbers indicate corresponding parts throughout.

FIG. 1 is an exploded perspective view of a cigarette using a filter made according to the invention;

FIG. 2 is a vertical cross-sectional view of a portion of the cigarette and the filter of FIG. 1;

FIG. 3 is a vertical sectional view, with portions broken away, of another form of cigarette filter;

FIG. 4 is a vertical sectional view of a portion of a cigarette and another form of filter made in accordance with the invention;

FIG. 5 is a vertical sectional view of still another form of the filter assembly of the invention;

FIG. 6 is a vertical sectional view of the filter of FIG. 5 taken along lines 6—6 thereof;

FIG. 7 is a vertical sectional view of still another form of filter element;

FIG. 8 is a vertical sectional view of the filter of FIG. 7, taken along lines 8—8 thereof;

FIG. 11 is a partial vertical sectional view of another form of cigarette filter assembly;

FIG. 12 is a vertical sectional view of a portion of a cigarette, showing another form of smoke filter according to the invention associated therewith;

FIG. 13 is an end view, partly in section and partly in elevation, of the cigarette and filter of FIG. 12;

FIG. 14 is a vertical sectional view of a portion of a cigarette having another form of smoke filter according to the invention associated therewith;

FIG. 15 is an end view, partly in section and partly in elevation of the cigarette and filter of FIG. 14;

Figure 9:
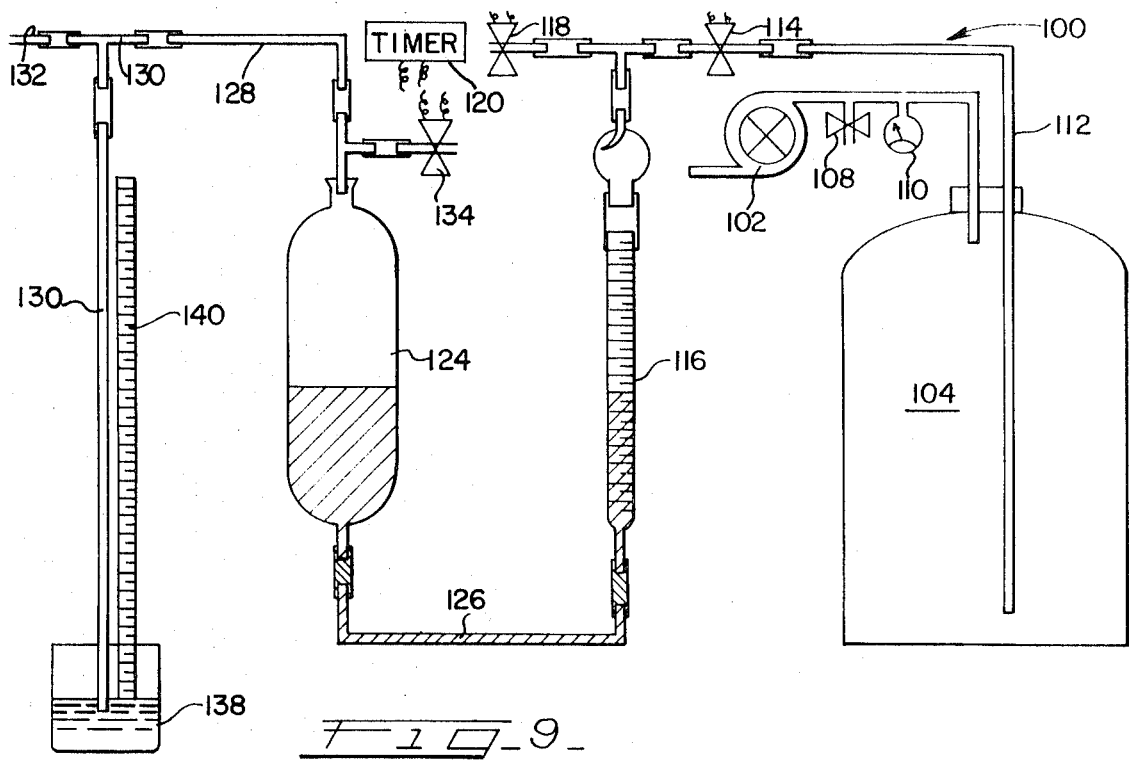
FIG. 9 is a partially diagrammatic view of a test apparatus used in evaluating the performance of filters made according to the invention.

The present invention will be initially described below in conjunction with the following examples which are set forth for illustrative purposes and which are not to be construed as a limitation on the scope of this invention. In this regard, it should be noted that while this invention finds particularly advantageous utility as a cigarette filter and while each of the following examples is specifically directed to cigarette filters, the filters described and claimed herein also may be suitably employed in the filtration or treatment of smoke from other smoker's articles such as, for example, cigars and pipes.

EXAMPLE 1

A plurality of cigarette filters were made by the individual batch method, using the following ingredients:

| | Percent by weight |
|---|---|
| Activated carbon, shell 200 mesh (Barnaby-Cheney) | 55 |
| Water | 42 |
| "Nopcofoam" prepolymer F-403-T-M-2 | 3 |

The "Nopcofoam" constituent is a prepolymer prepared by the addition of a hydroxyl-rich material, such as a polyester-based material with an excess of an isocyanate, such as a mixture of the isomers of toluene diisocyanate.

This prepolymer, in this instance, has approximately 15% excess isocyanate groups after the isocyanate-hydroxyl reaction has used up all available hydroxyl groups. Subsequent reaction of these excess isocyanate groups with water results in the liberation of carbon dioxide, and this reaction also creates a number of linkages of various kinds, so that the products resulting from the condensation of two isocyanate groups in the presence of the water include substituted urea linkages, biuret linkages, allophanate linkages, and the like.

The filter material was prepared by wetting the charcoal with water in the proportions mentioned above, making certain that the water was thoroughly mixed with the charcoal and good wetting action was obtained. The prepolymer was then thoroughly intermixed with the activated-carbon mixture. This mass was then placed in a multi-cavity mold wherein each cavity comprised a circular cylindrical bore, with a center cylindrical mandrel extending axially upwardly therein, so as to define a cavity in the space of a hollow circular cylindrical sleeve. The mold, which was treated with an appropriate release agent, was maintained at room temperature for a period of about two to four hours, following which the individual filter bodies were removed from the mold for use as the body in a filter assembly to be made in the manner set forth below. The finished filters were rigid sleeve of about 15 millimeters in length, an outside diameter of about 6.5 millimeters, and a 2.8 millimeter inside diameter. This sleeve, on a weight basis, comprised about 94% carbon and 6% binder, excluding the water from the calculations. The data set forth further herein summarizes and contrasts the results obtained with a filter made in accordance with the present invention with the results obtained with a typical commercial cellulose filter and a typical commercial charcoal-containing filter.

One important feature of the filter body made according to the present invention is that, although some of the binder components, when used in other proportions and with other materials, are capable of forming a closed or open cell, expanded polyurethane foam, in the practice of the present invention, these materials are used so as substantially to completely eliminate any bubble or foam formation. A close examination of the material which comprises the filter body made according to the invention indicates that the urethane material used as a binder is present in the form of very fine strands or fibers which do not coat any significant portion of the surface area of the aggregate particles. In some cases, the strands adhere to each other, but not to the particles. In those cases where the strands or fibers do coat the particles, the bond area is extremely small relative to the surface area of the particles in question. Thus, tests performed on a filter body made according to the teachings of the present invention indicate that the activity of the aggregate particles, even in the presence of a significant amount of binder material, such as from about 3% up to about 10% or more, ranges from only slightly less than the activity of a free bed of the same amount of the same size aggregate, to an equal amount of activity, and in some cases, an even greater activity than that of such loose bed of aggregate material. Although no particular principle or theory of operation is considered to be an essential part of the present invention, it is thought possible that the strands of fibers of the matrix extending throughout the interstices of the material form a net or particle entrapping matrix which either does not adhere by an adhesive action to the particles or, if adherent, adheres along extremely narrow lines of contact with the particles rather than in a contact region having a substantial area. The resultant structure, when acting as a filter, includes not only a large proportion of particles in abutting or contacting relation with one another, but by reason of its interstitial volume, spacing apart of some of the aggregate particles insures surprisingly low pressure drop thereacross in relation to its density and activity, and further insures that the maximum portion of the surface of each particle is available for a surface reaction. On the other hand, a loose bed of aggregate particles, having no binder of any kind, even though theoretically presenting its entire aggregate surface for reaction, often tends to settle so as to eliminate a number of fine interstices. This can be troublesome, particularly when the adsorbed or filtered material tends to clog the small interstices in the bed and therefore raise the pressure drop across the filter to a level which renders it ineffective. Accordingly, filters made in keeping with the invention not only avoid the problems of particle mobility and undesired compaction associated with loose bed filters, but have the further advantage of low pressure drop thereacross, a high degree of activity, and structural strength.

EXAMPLE 2

A filter body containing 95%, by weight, 20 x 40 mesh activated charcoal (Cliffchar, Cliff Dow Co.) was made by first mixing 380 grams of the activated charcoal with 187.5 grams deionized water in a one gallon working capacity Baker-Perkins mixer for three to four minutes. 20 grams of "Nopco SX–159D" were then added thereto with additional mixing for three minutes. "Nopco SX–159D" is identified as a polyether-based prepolymer made from toluene diisocyanate ("TDI") and a polyoxypropylene glycol (M.W. of about 1,000 to 4,000), and having about 7% to 10% excess of isocyanate groups. A sufficient portion of this mixture was then hand packed in a suitable mold and cured by passing steam thereover. After curing, the filter body was removed from the mold and was observed to exhibit excellent structural strength. The activated charcoal particles were in abutting relationship to each other with their surface areas substantially entirely exposed for contacting smoke passing therethrough.

EXAMPLE 3

A filter body containing approximately 74%, by weight, of 30 x 80 mesh activated carbon was made by first prewetting 350 grams of the carbon with 626.5 grams of water containing 15 grams of "Quadrol" [a catalyst and cross-linking agent, N,N,N',N'-tetrakis (2-hydroxypropyl) ethylene diamine, Wyandotte Chemical Corp.] and then mixed with 127.8 grams of a Simoniz Co. prepolymer in a Baker-Perkins mixer for about one minute. A sufficient portion of this mixture was then hand packed into a suitable mold and steamed for about three minutes. The Simoniz prepolymer was prepared by mixing (a) about 444 parts by weight of a hydroxylated polyether containing oxypropylene groups and having a hydroxyl number of about 50, and (b) about 63 parts by weight of a polypropylene glycol, of molecular weight 400 and hydroxyl number 288, with about 235 parts by weight of toluene diisocyanate (see U.S. Pat. No. 3,103,408). After curing, it was observed that the activated carbon aggregate particles were in abutting relationship to each other with their surface areas substantially entirely exposed for contacting smoke passing therethrough.

EXAMPLE 4

The filter body of this example was made with 30 x 80 mesh activated carbon and the Simoniz prepolymer of Example 3. The finished body had an activated carbon content of approximately 85%, by weight. In making this body, 700 grams of 30 x 80 mesh activated carbon were mixed with 855 grams of water and 127.8 grams of the Simoniz prepolymer for about three minutes. A sufficient portion of this mixture was then packed into a suitable mold and steam passed thereover for about six minutes. After curing, it was observed that the activated carbon aggregate particles were in abutting relationship to each other with their surface areas substantially entirely exposed for contacting smoke passing therethrough.

EXAMPLE 5

The filter body of this example was prepared with 30 x 80 mesh activated carbon and the Simoniz prepolymer of Examples 3 and 4. The activated carbon content of the filter body was 60%, by weight. In making the filter body, 700 gms. of 30 x 80 mesh activated carbon were first mixed with 467 grams of the Simoniz prepolymer in a Baker-Perkins mixer for approximately five minutes. A sufficient portion of this mixture was then molded as set forth above, and steam passed over the mold for ten minutes. After curing, it was observed that the activated carbon aggregate particles were in abutting relationship to each other with their surface areas substantially entirely exposed for contacting smoke passing therethrough.

EXAMPLE 6

The filter body of the present example was made with 30 x 80 mesh activated carbon as well as 100 x 200 mesh activated carbon; on a weight basis, the filter bodies contained 47% 30 x 80 mesh activated carbon and 25% 100 x 200 mesh activated carbon. In making this filter body, 248 grams of 30 x 80 mesh activated carbon were first mixed with 82 grams of 100 x 200 mesh carbon. 250 grams of water containing 15 grams of the "Quadrol" referred to above were added to the activated carbon and thoroughly mixed therewith. The latter mixture was combined with 80.7 grams of the Simoniz prepolymer and 40.35 grams of Nopco prepolymer #H–102–N–T. This material is identified as a polyether-based prepolymer having free isocyanate groups and resulting from the reaction of TDI with polyoxypropylene glycols of M.W. 100 to about 1,000. The filter was then made with this mixture by packing a sufficient portion thereof into a suitable mold and steaming as identified in Example 4. After curing, it was observed that the activated carbon aggregate particles were in abutting relationship to each other with their surface areas substantially entirely exposed for contacting smoke passing therethrough.

EXAMPLE 7

The filter body of this example was made by first combining 15 parts, by volume, of Nopco "SX–159D," 7 parts, by volume, of water and 78 parts, by volume, of a granulated activated charcoal (average grain size of from 0.025 to 0.05 inch). These materials were thoroughly mixed together so that all of the charcoal granules received a uniform coating of the "SX–159D" urethane prepolymer. Three drops of tetramethylbutyldiamine were then added and a sufficient portion of this mixture immediately transferred to a suitable mold.

The mold containing these articles was then placed in an oven at a temperature of 175° F. for about one half hour after which time the resin binder was cured. After curing, it was observed that the activated charcoal particles were in abutting relationship to each other with their surface areas freely exposed for contacting smoke passing therethrough.

EXAMPLE 8

This example illustrates the making of a continuous cylinder of activated charcoal filter material by an extrusion technique. The discrete filter bodies can be then made by cutting the extruded cylinder into discrete lengths after it is formed. The filter body of this example contained 77%, by weight, of 20 x 40 mesh activated charcoal. In making this cylinder, 686.4 grams of 20 x 40 mesh activated charcoal ("Cliffchar," Cliff Dow Co.) were mixed with 202.5 grams of Nopco "SX-159D" in a one gallon working capacity Baker-Perkins mixer for approximately five minutes and then transferred to the hopper of a "Hobart" meat grinding extruder. The mixture was extruded by an auger from an extrusion chamber while curing steam was fed into the extruding mass through suitable means such as a mandrel. After curing, it was observed that the activated charcoal aggregate particles were in abutting relationship to each other with their surface areas freely exposed for contacting smoke passing therethrough.

EXAMPLE 9

The filter body of this example was also made by extrusion techniques and contained 64%, by weight, of 20 x 40 mesh activated charcoal. In making this filter body, 700 grams of 20 x 40 mesh activated charcoal were mixed with 400 grams of the Nopco "SX-159D" prepolymer in a Baker-Perkins mixer for approximately five minutes. A number of such batches were prepared and fed successively to the "Hobart" extruder mentioned above in Example 8. The mixture was extruded from the opening in a long extrusion chamber having a center mandrel therein, with steam being supplied to the mass during extrusion to provide both heat and some water of reaction. The resulting extruded tube was cut into a number of individual filter bodies. After curing, it was observed that the activated charcoal particles were in abutting relationship to each other with their surface areas freely exposed for contacting smoke passing through the filter body.

EXAMPLE 10

This example illustrates the extrusion of a filter body of active material containing a composite or mixed particle size aggregate composed of 30 x 80 mesh activated carbon and 100 x 200 mesh activated carbon. 1,575 grams of 30 x 80 mesh activated carbon and 525.6 grams of 100 x 200 mesh activated carbon were mixed with 255.6 grams of "Nopco P-502-T" prepolymer and 511.2 grams of Simoniz Co. prepolymer together with 1,500 grams of water and 90 grams of the catalyst and cross-linking agent "Quadrol." "Nopco P-502-T" is described as a polyester-based prepolymer having excess isocyanate groups and resulting from the reaction of TDI with a less than stoichiometric quantity of castor oil. This mixture was then extruded as described above in Example 8 or 9. The extruded sleeve was cut into individual filter bodies wherein the activated charcoal aggregate particles were in abutting relationship to each other with their surface areas freely exposed for contacting smoke passing through the filter body.

The above Examples 1 to 10, inclusive, are intended to illustrate the manufacture of filter bodies from charcoal of fine particle size, moderately fine particle size, and intermediate particle size, as well as the formation of filter bodies having aggregate particles of different sizes. The examples also illustrate that the binder may be present in an amount of 5% or less or that it may be present in an amount up to 40% or more, for example. It will be appreciated that, depending on the particle size, the degree of rigidity, the amount of surface activity required, and other properties desired, the binder content may be varied within considerable limits, depending principally on the primary requirements imposed on the filter.

For example, in some cases, high strength of the filter body might be a primary concern. In other cases, minimum particle size might be desired, and in other cases, the reaction time or curing conditions, for example, might be the paramount consideration. At any rate, however, filters made using activated carbon as the ingredient are able to be made and used successfully according to any of the above examples, and it is therefore obvious that other variations will be effective to produce operable smoke filters according to the invention.

Referring now to the manufacture of other filter cartridges, it has been well established that ion exchange resins of various types are suitable for treatment of smoke, and accordingly, several examples will now be set forth which are directed to the production of filter bodies using ion exchange materials as the active ingredient.

EXAMPLE 11

Filter bodies for use in making cigarete filters embodying the present invention and having an ion exchange resin as the active material therein can be prepared as follows. For a typical filter body having 94.7%, by weight, of ion exchange resin, 1,489 grams of 16 x 50 mesh cation exchange resin (sodium form), sold under the trademark "Ionac C-249," Clack Inc., was mixed with 41.7 grams of the Simoniz prepolymer of the above examples, 41.7 grams of "Nopco #H-102-N-T" prepolymer and 10 grams of the catalyst and cross-linking agent "Quadrol" by a spatula in a mixing vessel for a few minutes. The mixture was then placed into a filter forming mold, and steam was passed thereover for about 20 minutes. After curing, it was observed that the ion exchange resin beads were in abutting relationship to each other with their surface areas substantially entirely exposed for contacting smoke passing through the filter body.

EXAMPLE 12

The ion exchange resin bed filter body of this example was composed of approximately 96.5%, by weight, of ion exchange resin beads. In making this filter body, 1,489 grams of 16 x 50 mesh exchange resin beads (sodium form) sold under the trademark "Ionac C-249" (Clack, Inc.) were mixed with 28.4 grams of the Simoniz prepolymer of the above examples 28.4 grams of "Nopco #H-102-N-T" prepolymer and 10 grams of "Quadrol" and placed in a filter body mold for several minutes. Steam was introduced into the mold for approximately 20 minutes to cure this mixture. After curing, it was observed that the ion exchange resin beads were in abutting relationship to each other with their surface areas substantially entirely exposed for contacting smoke passing through the filter body.

EXAMPLE 13

The filter body of this example was made by first combining 15 parts, by volume, of the "Nopco SX-159D" prepolymer of the above examples with 17 parts, by volume of water and 78 parts, by volume, of synthetic styrene ion exchange beads of approximately 0.025 inch in diameter with substantial mixing. Three drops of tetramethylbutyldiamine were then added and the mixture immediately transferred to a suitable mold.

The mold containing these materials was then placed in an oven at a temperature of 175° F. for about ½ hour, after which time the polyurethane resin was cured. The filter body was then removed from the mold. It was observed that the ion exchange resin beads were in abutting or contacting relationship to each other with their surface area substantially entirely exposed for contacting smoke passing through the filter body.

EXAMPLE 14

This example illustrates the making of a filter body which is composed of composite aggregate, viz, synthetic styrene ion exchange beads, granulated charcoal and manganese greensand. To 22 parts by volume of "Nopco SX-159D" were added 10 parts by volume of water, 25 parts by volume of finely granulated charcoal (average grain size from 0.025 to 0.05 inch), 25 parts by volume of synthetic styrene beads (average particle diameter being approximately 0.025 inch) and 28 parts by volume manganese greensand (average particle diameter being approximately 0.020 inch). These materials were thoroughly mixed. Three drops of tetramethylbutyldiamine were then added and the mixture immediately transferred to a suitable mold which was then placed in an oven at a temperature of 175° F. For about ½ hour, after which time the polyurethane was cured. The aggregate particles in the filter body were observed to be in abutting relationship to each other with their surface areas substantially entirely exposed for contacting smoke passing through the filter body.

EXAMPLE 15

Cigarette filter bodies can also be prepared by combining 30 parts by volume of the "Nopco SX-159D" prepolymer of the above example with 20 parts by volume of water and 180 parts by volume of synthetic styrene ion exchange beads of 200 x 300 mesh diameter. The beads and water are first thoroughly mixed to insure wetting of the beads, following which the synthetic resinous material is thoroughly intermixed with wet beads. This material is then inserted in a multi-cavity mold adapted to form hollow filter sleeves and then cured for about ½ hour at a temperature of 170° F. The reaction can be catalyzed by the addition of about 5 drops of tetramethylbutyldiamine (N,N,N',N', TMBDA). One brand of ion exchange beads found useful in this example is a sulfonic acid-styrene-divinylbenzene material known as "Dowex 50" (Dow Chemical Co.). In addition, other surface active ion exchange beads, such as styrene-divinylbenzene beads having quaternary ammonium functional groups, carboxyl groups, or the like are useful in the practice of the invention. Such materials are sold under the trademark "Permutit," "Amberlit," "Lewatit," "Ionac," and others.

The above examples illustrate the use of activated carbon or charcoal, and ion exchange materials as being suitable for use with the invention. These forms of aggregate material are preferred, but the invention is not intended to be limited solely to the use of these materials since it is well known that, in addition to materials chemically and physically similar to those exemplified above, a number of other known surface active materials are capable of adsorbing and or removing various constituents of smoke from a smoke stream. These materials include other ion exchangers, silica gel, and manganese greensand, for example. By "surface active" or "active" as used herein, and in the claims are meant not only those materials which are, in a purely technical sense, surface active, but also other materials wherein filtration, absorbtion, adsorption or other phenomena involved in constituent removal from smoke are affected by the amount, disposition, or degree of subdivision of the materials in question.

Materials intended to be encompassed by the expressions "active" and "surface active" include by way of example, activated charcoal impregnated with cobalt oxide, zinc oxide, silver oxide, molybdenum oxide for the oxidation of carbon monoxide to carbon dioxide, manganese and copper oxides (hapcolites), manganese (IV) oxide dihydroxide for removing nitrogen oxides from smoke, material treated with water soluble, weak basic inorganic salts of sodium, potassium and lithium phosphite for removal of hydrogen cyanide, materials impregnated with 1,2,4-butane diol for selective removal of nicotine, various materials impregnated with acidic carboxylic acid alkyl esters, activated bentonite clay, cellulose powder, fuller's earth, diatomaceous earth, alumina, silica gel, molecular sieves, glass fibers, asbestos fibers, and other suitable materials.

Thus, it will be seen that the invention is not limited to the exact form of surface active aggregate material or other material used. It is contemplated that, depending on the exact material or materials desired to be eliminated from the smoke, different active materials will be selected for use, either individually, or in various combinations. Also, other materials not yet known or used for these purposes may be advantageously formed into filter bodies by the techniques exemplified above. The binding techniques illustrated in the above examples are intended to accomplish the object of providing fine particle size and relatively dense but highly active filter bodies which are particularly suitable for use in filters for cigarette and other smoker's articles.

In particular, one outstanding advantage of this filter body construction is that, since very fine particles may be used, the filter ultimately made from the material may have a thin but highly effective section measured in the direction of smoke travel, since the fine particle size allows a much faster reaction than a larger particle size. Accordingly, the smoke need not pass through a lengthy filter section in order for sufficient time to be provided for the filter surface reaction to take place.

In the embodiments descirbed in Examples 1 to 15 above, the filter body was made by forming a polymeric particle entrapping matrix from liquid reactants which, upon curing, produce strand-like polymeric portions which surround and entrap the aggregate particles without adversely affecting their surface activity. These strand-like polymeric portions of the matrix fill only a very small proportion of the interstices of the entire mass and cover only a very minor portion of the surface area of the aggregate particles. In most embodiments of this invention, virtually the entire surface and interstitial volume of the filter body is therefore available for passage of smoke or other fluid to be treated and in all embodiments at least a substantial portion of such volume is available.

However, other methods, although not presently preferred, are available for forming filter bodies which are operative with the invention. One such method involves dispersing finely subdivided particles of a thermoplastic resin throughout a mass of aggregate particles, and, while heating the mass to the softening point of the resin, but well below the acutal melting point thereof, compressing the mass so as to form a sintered body. This body is characterized by the presence of thermoplastic material which, although not having been allowed to become significantly fluid, is nevertheless able to be sintered into a reticulum under pressure and, in some cases, is able to attach itself to aggregate particles at only a few points thereof leaving the major or at least a significant portion of the surface thereof available for the desired treating reaction.

Since a desired characteristic of the filter bodies of the present invention is that they be self-supporting, and in some cases relatively structurally rigid, and since a characteristic of at least some of the above described fluid treating particles, particularly ion-exchange resin materials, is that they undergo dimensional change as they change chemically from one form to another in use, a binder material is preferred which will be at least flexible enough so as not to crack or be weakened under these conditions. Most of the materials specifically described above are semi-rigid urethane materials, that is, they do not possess the degree of cross linking desired for rigid foam formulations. Ideally, the strands or fibers are tough and somewhat flexible, but not so rigid as to be brittle. In some cases, the fibers may actually be resilient, elastomeric or rubbery, provided the binder displays sufficient ability to hold the particles in place in the body.

The physical criteria set forth above which are desirable may also be attained by the use of other materials which perform in a similar or related manner. For example, certain thermosetting materials such as epoxy resins, phenolic resins, and the like are known to be used to form rigid foams. These materials, when used in modified forms and without substantial foam formation can also be adapted to the practice of the present invention. For example, in the urethane art, foam-forming materials usually include, in addition to the basic resin materials, surface active agents adapted to the formulation of bubbles, stabilizers for the bubbles, and blowing agents. The present invention, as pointed out in the illustrative examples, uses some of the materials conventionally used to make foams, but not all such materials, since foam or bubble formation is desired to be avoided. Accordingly, the use of resinous materials such as phenol-formaldehydes, urea-formaldehydes, melamine-formaldehydes, epoxies, acetals, amides, polyethers, polyesters and natural and modified natural materials may be useful with the present invention, provided strands or fibers such as these described herein are made, and provided there is little or no bubble or foam formation, and provided further, and very importantly, that the minimum amount of interstitial volume be occupied by the binder and that the surface of the active aggregate material not be occluded or rendered inactive to any substantial degree. Preferably, the closely spaced fluid treating aggregate particles are bound together by a matrix which consists essentially of a cured resinous polymeric material formed from liquid reactants selected from the class consisting of polyurethane resin systems, epoxy foamable two-component resin systems, and polyvinyl formal polymeric systems.

Referring now in detail to the drawings, the use of a typical filter body as an element in a cigarette filter assembly is shown. Thus, FIG. 1 shows a filter cigarette 10 which comprises a tobacco-filled cigarette body portion 12 and a filter assembly portion 14 appended thereto. The cigarette body 12 is of conventional construction and includes a tobacco core 16 surrounded by an outer paper sleeve 18. The forward end portion 20 of the cigarette is to be lit by the smoker and the rear end portion 22 of the body 12 is adapted to receive the filter assembly 14 in an abutting relation to the rear face of the tobacco core 16 which may be closed off by a porous plug or so-called prefilter 24. A mouthpiece in the form of a sleeve 26 is provided, and the sleeve 26 has a cross-sectional shape corresponding to the cross-section of the cigarette body 12 and is disposed so as to encircle the filter body 28. The filter body 28 includes a radially outwardly facing annular outer surface 30 which defines the entry area of filter body 28, and an axially extending, radially inwardly facing annular inner surface 32 defining a central bore 34 in the body 28. A flat, circular forward wall 36 faces toward the front of the filter body 28, and a rear face 38 surrounds the rearwardly facing opening 54. An end seal unit 40 disposed to the rear of the filter body 28 includes a central bore 42 coextensive with the bore 34 and defined by an inner margin 44 of the end seal unit body 46. The unit 40 prevents smoke flow through the rear face 38 of the filter body 28.

Referring now to FIG. 2, it can be seen that with the filter assembly 14 associated with an end of the cigarette body 12, a chamber 48 of an annular configuration is defined between the outwardly facing annular outer wall 30 of the filter body 28 and the inwardly facing wall 50 of the sleeve 26. A flat circular disc 52 covers the front face 36 of the filter body 28 and, in use, the end seal unit 40 closes off the rear face 38 of the filter body 28, allowing smoke to flow outwardly from the bore 34 only through the rearwardly facing opening 54 defined by the rear margins of the inner surface 32.

In FIG. 2, an outer sleeve 56 is provided which may be a cork tip of a relatively stiff paper sleeve, for example. It will be appreciated that the exact details of the manner of attachment of the filter assembly 14 to the cigarette body 12 is not an essential feature of the invention, but may be accomplished in any known manner consistent with the objects of this invention.

In FIG. 2, the filter body 28 is shown to include an increased diameter, annular flange portion 58 extending around the rear end portion of the body 28, and a forward center section portion 60 having an axial thickness substantially equal to the radial thickness of the portion of the filter body 28 lying between the walls 30, 32. These elements 58, 60 may be included but are not necessary to the practice of the invention for reasons set forth more fully herein.

Referring now to the use of the filter cigarette shown in FIGS. 1 and 2, it is clear that smoke may not, by reason of the presence of the disc 52 and the seal 54, proceed through the filter in a purely axial direction, and therefore the smoke proceeds generally in the direction shown by the arrows, that is, radially inwardly through the filter body 28 from the chamber 48 into the bore 34. Thus, in the embodiment shown, the surface 30 of the filter facing upstream is equal to the entire surface area of a cylinder having a diameter of the filter body 28. In this case, assuming a filter body having a length of 15 millimeters (mm.) and a diameter of 6.5 mm., the outside surface area is equal to about 300 to 310 square millimeters (mm.$^2$). The thickness of the body portion through which the smoke must pass, at the minimum, is one-half the difference between the inner and outer diameters of the filter body, in this case, 1.85 mm. for a filter body having an O.D. of 6.5 mm. and an I.D. of 2.8 mm. On the other hand, assuming that the diameter of the cigarette itself is 7.15 mm., in an axial flow filter of 15 mm. length, the surface area would be only 40 to 42 mm.$^2$, while the minimum distance through the filter element would be 15 mm. If an axial flow filter of another common length, namely 9.5 ml. were used, its surface area would be the same as that of the other axial flow filter, namely 40 to 42 mm.$^2$, and the minimum thickness would be 9.5 mm. which is considerable in relation to the 1.85 mm. travel path length provided by a filter made according to the invention. As will be brought out in the tests, the fine particle size of the filters of the invention have made it possible to achieve filtration with about a 405 mm.$^3$ volume filter which is equal to or better than that obtained with either the 600 mm.$^3$ or the 380 mm.$^3$ volume axial flow filters of conventional construction (15 mm. and 9.5 mm. lengths, respectively). In addition, much less pressure drop occurs across this filter as will be seen.

In the cigarette shown in FIGS. 1 and 2, the plug or prefilter 24 has the primary purpose of preventing the tobacco from moving out of the rear of the cigarette body 12. This plug or prefilter may be made of cotton, cellulose fibers, or the like, and although it may trap some larger tar particles or the like, it does not contribute significantly to the filtering action of the filter body 28 and it is not a necessary part of the present invention.

In the embodiment shown in FIG. 2, since the portions 58, 60 of the filter body 28 have thicknesses equal to the radial thickness between surfaces 30, 32, the disc 52 and the seal 40 can be eliminated if the portions 58, 60 are retained. If the portions 58, 60 are eliminated then the seal 40 and disc 52 or their equivalents would be required so that means are provided for insuring that the smoke travel path extends through at least a significant length of filter body and that the filter body cannot be bypassed by the smoke stream.

FIG. 3 shows a construction which is identical to that shown in FIG. 2 except that a post filter 62 is provided. In the event the filter body 28 is of a self-supporting construction but is not highly structurally rigid, the construction of FIG. 3 may be preferred since prefilter 24 and post filter 62 afford added structural strength.

Referring now to FIG. 4, it can be seen that in the construction shown, the outer surface 30 of the filter body 28 defines the frustum of a cone which constitutes the entry area of the filter body. The inner surface 32 similarly defines a conical opening or re-entrant which serves as the bore 34 in the filter body 28. A disc 52 extends across the front face portion 36 of the body 28 and an end seal 40 is provided at the rear end of the body 28. A prefilter 24 is shown in this example but is not strictly necessary.

In a cigarette filter such as that shown in FIG. 4, the chamber 48 lying inwardly of the wall 50 is of varying cross-sectional thickness throughout its length. However, since the filter body 28 is of uniform cross-sectional thickness, measured radially, smoke flow therethrough is generally in a radial direction, or at least smoke flow therethrough has a significant radial component. As pointed out in connection with FIGS. 2 and 3, if the filter possesses sufficient thickness in the regions 58, 60 to prevent an undesirably short flow path therethrough, the seal 40 and disc 52 may be eliminated.

Referring now to FIGS. 5 and 6, a filter construction is shown wherein the body 28 includes outwardly extending flutes or ribs 64, which, on their radially outer edges, contact the inwardly facing surface 50 of the sleeve 26. In this embodiment, a plurality of chambers 48a, 48b, etc., are provided, the sidewalls of these chambers being defined by the ribs 64. In the construction shown in FIGS. 5 and 6, an opening 66 is provided at the forward portion of the body 28 in addition to the opening 54 at the rear thereof. Therefore, the seal 40 and the disc 52 or their equivalents are necessary since these elements 40, 52 provide means for insuring that the smoke does not bypass the filter altogether.

In the construction shown in FIGS. 5 and 6, the ribs 64 also serve as a suitable means for offsetting and locating the outer sleeve 26 in relation to the filter body 28. As can be seen in reference to FIG. 5, since the filter body 28 includes the bore 34 extending entirely therethrough, this shape of body 28 may be prepared by the extrusion techniques described above, or by other extrusion techniques, and accordingly, such filter bodies 28 may be made very economically and rapidly.

FIGS. 7 and 8 illustrate a construction in which the body 28 includes the bore 34 extending axially entirely therethrough, and this filter body is in the form of a simple cylindrical sleeve. In this construction, the disc 52 and the seal 40 or their equivalents are also necessary. As shown in FIG. 8, a plurality of ribs 68 may be provided by appropriately corrugating a paper or like liner 70 so that adjacent, inwardly extending folds thereof are adhered together in facing relation, with the resulting ribs 68 being spaced apart from each other to define a plurality of chambers 48c, 48d, etc. It is obvious that the ribs 68 or any counterparts thereof used to space the sleeve 26 outwardly from the filter body 28 might also be formed by any other suitable means.

In the above described illustrations of filter assembly constructions, it will be noted that the direction of the flow of the smoke through the filter is radial, or at least that the smoke direction has a significant radial flow component. In view of the fact that when the filter is associated with a cigarette, it is desired to present a large cross-sectional surface area of the filter body to the incoming smoke, the radial flow arrangement provides a conveniently large surface area which may nevertheless be confined within a reasonable volume and within a diameter equal to or smaller than the outside diameter of the cigarette with which it is associated. However, in the event the filter unit is adapted for use with a ciagarette, cigar, pipe, or the like, but is in the form of a separate holder, or in the form of a component of a pipe, for example, a large surface area, thin cross-section filter arrangement in a form of a flat disc could be provided, and might include means for directing the smoke stream onto the filter surface in an evenly distributed manner. Since the present invention is concerned principally with filters attached to cigarettes, cigarillos, etc., however, only the radial flow models were described in detail.

Filters prepared in accordance with Example 1 were tested and compared with a number of different brands of commercially available filter cagarettes. The performance of the filters in relation to other cigarette filters was evaluated and summarized in the tables below.

Each cigarette tested was placed in a testing apparatus which was adapted to draw a 35 milliliter (ml.) volume "puff" of smoke, during a period of two seconds, from a cigarette associated with the apparatus every fifty-eight seconds, thus taking one puff every one minute until a desired number of puffs were taken. The pressure drop across a cigarette filter was able to be measured for comparison purposes by the use of a water manometer forming a part of the apparatus 100. The use of such an apparatus was suggested by literature already published and known in this field. Before referring to the test results, the test apparatus will be described.

Referring now to FIG. 9, the tester 100 is shown in detail. The tester 100 includes a vacuum pump 102 connected to a surge tank 104 by a line 106 which includes bleeding valve 108 and a vacuum gauge 110. The surge tank 104 is connected to a vacuum line 112, flow through which is controlled by a normally closed valve 114, and to a fluid reservoir 116, also by the line 112. A normally open valve 118, operated by an automatic timer 120 is also connected to a branch 122 of the line 112. A second reservoir 124 is series connected through a line 126 to the first reservoir 116. A line 128 extending upwardly from the second reservoir 124 has one end portion 130 thereof connected to a cigarette holder 132, and line 128 to the atmosphere. A vertically extending manometer tube 136, the bottom portion of which is immersed in a supply of liquid 138, is associated with a visible scale 140, extending vertically along the tube so as to form a manometer for measuring the pressure drop across the cigarette filter when fluid displacement in the reservoir 124 draws a puff from the cigarette. In use, with valve 114 closed and valves 118 and 134 open, the vacuum pump and bottle are isolated from the cigarette, while both reservoirs 116 and 124 are vented to the atmosphere.

This will be referred to as the normal or quiescent state of the apparatus 100. When it is desired to draw the two second puff, the system will be operated by the timer 120 so as to move to a second or operative state wherein the movable part of each valve 114, 118, and 134 assumes a position opposite to the position such part occupied in the quiescent state. Thus, in the quiescent state, no vacuum is drawn in either reservoir 116, 124 and there is no vacuum in lines 128 or 136. To initiate the two second, smoke, drawing period, the timer 120 causes simultaneous actuation of all three valves 114, 118, and 134. Thus, with valves 118 and 134 closed, and with valve 114 opened, suction in the surge bottle 114 causes a vacuum in the portion of the reservoir 116 above the liquid level, causing the liquid to rise. Consequently, the liquid in the reservoir 124 is simultaneously drawn to a lower level by an equal volume. A volume of air equal to this displaced amount therefore flows through the cigarette and the associated filter which is disposed in the holder 132.

During this time, the vacuum able to be generated upstream of the reservoir 124 is proportional to the pressure drop in the filter, and this vacuum or pressure may be read by comparing the liquid level in the tube 136 with the adjacent scale 140. In other words, if the filter resists air or smoke passage therethrough, a high vacuum will temporarily exit in the system upstream of the reservoir 124, creating a high liquid level in the tube 136 until sufficient air or smoke volume may pass through the filter and dissipate the vacuum in the upper portion of the reservoir 124. If there is relatively little resistance to flow through the filter, a high vacuum will not be able to be established in the reservoir 124 since a significant air or smoke volume immediately passes through the filter and begins immediately to equalize the pressure above the liquid level in the reservoir, the force tending to raise the water level in the tube 136 is small and the liquid level in the tube 136 will be low.

The meniscus of the liquid in the tube 136 is read as a temporary equilibrium exists during a portion of the time following liquid displacement and prior to the time vacuum in the reservoir 124 is dissipated. After the two second period, the time 120 reverses the position of the movable parts of the valves 114, 118, and 134 thereby venting reservoirs 116 and 124 to the atmosphere, and isolating the surge bottle 104 and its associated pump 102 from these reservoirs 116, 124 and therefore the tester returns to and remains in the quiescent state until the cycle is repeated as set forth above.

Cigarette filters made according to the above examples, as well as those made according to similar methods and differing only in detail were tested extensively to evaluate the performance of the filters both when the filters were associated with cigarettes, and when the filters alone were tested. Furthermore, when the filters were tested in association with cigarettes, they were tested as to pressure drop first, before the cigarette was lit, and thereafter, at each succeeding puff until about 7 or 8 puffs, more or less, were taken.

Since it is known that a certain amount of moisture in the air may be taken up by cigarette filters, including those made according to the invention, extensive tests were run to determine the weight gain of radial flow and axial flow filters made according to the above set forth examples to evaluate the relation of pressure drop or filter effectiveness to the additional weight taken on by the filters in absorbing and/or adsorbing additional moisture. For example, it was established that after a suitable time period under conditions of 90% humidity, filters made with activated carbon might typically gain up to 12% to 15% or more of weight. However, the tests established that pressure drop across these filters was not affected significantly by the amount of moisture present in such filters. Thus, although typically speaking, the filters gained from 2% to 3% weight when conditioned at 40% humidity, about 5% at 50% humidity and up to 12% or more at 90% humidity, the pressure drop across the filters varied by no more than only 5% to 7% in extreme cases and, in most cases, varied either not at all, or in a completely random manner. Therefore, the data summaries relating to this feature of the filter are omitted herefrom although it is obvious that filters made according to the invention are advantageous insofar as they are unaffected by humidity, whereas some prior art filters are adversely affected thereby.

The tests concerning pressure drop across the filters were made on radial flow filters such as those illustrated in FIGS. 7 and 8 and having a length of 15 mm., a 7 mm. outside diameter, and a 2.8 mm. inside diameter, using 200 mesh carbon particles; on axial flow filters of a solid cylindrical shape 9.55 mm. in length and 7 mm. in diameter; and on axial flow filters of a solid cylindrical configuration and of a 7 mm. diameter and a 15 mm. length. In all cases, the aggregate material was the same in each series of comparison tests.

One principal object of the tests made with the filters of the invention was to establish the relationship of the pressure drop across filters made according to the invention and having a radial flow pattern and the drop across ordinary filters presently used commercially, and to compare pressure drops across radial flow filters to the drop across filters made of the highly active aggregate material described in Examples 1 to 15, but of an axial flow, solid cylindrical configuration. One principal advantage of the invention is that because of the extremely small size of the aggregate particles, the filter material body is sufficiently active so as to be able to remove constituents of the smoke therefrom as effectively when passing through a filter thickness of less than 2 mm. as when the smoke is passing through a filter thickness of 9 to 15 mm. In both cases, the aggregate material of the present invention was considerably more effective as a filter median than the commercial filters now in use. Typically, these commercial filters consist of cellulose fibers, paper fibers, or the like. In some cases, filter paper having merely trace amounts of charcoal or activated carbon therein is used; in other cases, carbon is dusted lightly onto the filter fibers, and a filter paper element is downstream of the fibers; and in one case, a loose bed of 20 x 40 mesh carbon is held between two fiber filter elements. Accordingly, it having been established that the filter material of the invention is superior to mere fiber filters or loose beds of charcoal or carbon particles, as far as activity per volume of material is concerned, which result is not entirely unexpected, the tests established that, within the volume available for placing a filter in a commercially acceptable cigarette, the pressure drop across the filter could be made desirably low without causing loss of filter effectiveness.

A summary of the data in tabular form and a discussion thereof will now be set forth.

TABLE I

"Pall Mall Filter 100's" Pressure Drop (mm. H$_2$O) During Puff Number

| Cigarette Number | Unlit | 1 | 2 | 3 | 4 | 5 | 6 | 7 | 8 | 9 | 10 | Average |
|---|---|---|---|---|---|---|---|---|---|---|---|---|
| 1 | 128 | 135 | 144 | 150 | 150 | 158 | 150 | 154 | 132 | 152 | 170 | 150 |
| 2 | 129 | 131 | 142 | 148 | 141 | 142 | 140 | 142 | 158 | 152 | 138 | 143 |
| 3 | 125 | 141 | 150 | 151 | 145 | 139 | 145 | 138 | 137 | 133 | 137 | 142 |
| 4 | 133 | 141 | 149 | 145 | 150 | 148 | 140 | 151 | 159 | 143 | 128 | 145 |
| 5 | 131 | 132 | 139 | 145 | 147 | 148 | 157 | 150 | 135 | 140 | 146 | 144 |
| 6 | 132 | 137 | 149 | 154 | 147 | 141 | 143 | 135 | 144 | 135 | 150 | 144 |
| 7 | 138 | 151 | 161 | 162 | 161 | 162 | 158 | 152 | 153 | 161 | 150 | 157 |
| 8 | 132 | 140 | 154 | 159 | 151 | 148 | 133 | 147 | 146 | 130 | 135 | 144 |
| 9 | 132 | 150 | 154 | 160 | 155 | 156 | 143 | 170 | 134 | 139 | 141 | 150 |
| 10 | 132 | 136 | 158 | 174 | 160 | 155 | 155 | 150 | 148 | 171 | 170 | 158 |
| 11 | 130 | 150 | 152 | 156 | 152 | 168 | 142 | 137 | 152 | 131 | 132 | 147 |
| 12 | 134 | 160 | 171 | 162 | 172 | 156 | 151 | 157 | 140 | 161 | 150 | 158 |
| 13 | 132 | 142 | 155 | 160 | 161 | 150 | 150 | 156 | 152 | 141 | 159 | 153 |
| 14 | 135 | 150 | 157 | 155 | 160 | 156 | 148 | 161 | 153 | 150 | 166 | 156 |
| 15 | 129 | 161 | 157 | 157 | 158 | 166 | 150 | 141 | 149 | 152 | 159 | 155 |
| 16 | 134 | 146 | 160 | 170 | 161 | 158 | 159 | 168 | 168 | 158 | 136 | 158 |
| 17 | 132 | 151 | 164 | 168 | 152 | 153 | 160 | 152 | 144 | 152 | 140 | 154 |
| 18 | 132 | 154 | 156 | 161 | 162 | 158 | 153 | 162 | 147 | 162 | 150 | 157 |
| 19 | 132 | 137 | 148 | 149 | 148 | 144 | 140 | 141 | 138 | 138 | 140 | 142 |
| 20 | 129 | 150 | 159 | 157 | 150 | 156 | 148 | 150 | 159 | 142 | 130 | 150 |
| 21 | 132 | 141 | 152 | 153 | 157 | 150 | 157 | 142 | 132 | 135 | 152 | 147 |
| 22 | 139 | 152 | 160 | 152 | 152 | 152 | 155 | 161 | 152 | 169 | 152 | 156 |
| 23 | 140 | 145 | 166 | 161 | 158 | 160 | 160 | 148 | 160 | 142 | 140 | 154 |
| 24 | 128 | 131 | 140 | 142 | 140 | 142 | 132 | 142 | 132 | 141 | 141 | 138 |
| 25 | 138 | 141 | 160 | 162 | 153 | 166 | 168 | 152 | 142 | 132 | 132 | 151 |

The "Pall Mall Filter 100" cigarettes of Table I were purchased on the open market and were of the so-called 100 mm. length. The filter was a cellulose fiber filter of conventional construction. Twenty-five cigarettes were tested, first as to pressure drop with the cigarette unlit, and thereafter as each puff was taken. In the table the consecutive values read from the manometer are arranged from left to right. The average pressure drop for each sample is set forth in the extreme right hand column.

TABLE II

Pressure Drop, "Pall Mall Filter 100's" As Purchased but with Filters Cut Off

| Cigarette Number | Unlit | 1 | 2 | 3 | 4 | 5 | 6 | 7 | 8 | Average |
|---|---|---|---|---|---|---|---|---|---|---|
| 1 | 68 | 95 | 93 | 102 | 98 | 80 | 78 | 84 | 58 | 86 |
| 2 | 82 | 95 | 104 | 97 | 95 | 98 | 112 | 90 | 111 | 100 |
| 3 | 86 | 110 | 112 | 111 | 104 | 114 | 102 | 84 | 84 | 107 |
| 4 | 71 | 100 | 88 | 93 | 81 | 98 | 84 | 85 | 77 | 88 |
| 5 | 73 | 91 | 100 | 88 | 96 | 78 | 79 | 98 | 74 | 88 |
| 6 | 77 | 100 | 93 | 105 | 95 | 98 | 84 | 88 | 79 | 93 |
| 7 | 69 | 91 | 101 | 108 | 95 | 78 | 80 | 85 | 68 | 88 |
| 8 | 76 | 97 | 103 | 94 | 94 | 96 | 83 | 87 | 80 | 92 |
| 9 | 74 | 102 | 98 | 97 | 91 | 78 | 90 | 78 | 96 | 91 |
| 10 | 73 | 90 | 96 | 97 | 82 | 91 | 77 | 76 | 83 | 87 |
| 11 | 87 | 101 | 110 | 118 | 115 | 104 | 86 | 118 | 84 | 105 |
| 12 | 83 | 106 | 108 | 114 | 92 | 88 | 93 | 78 | 92 | 96 |
| 13 | 76 | 98 | 100 | 97 | 92 | 98 | 92 | 98 | 86 | 95 |
| 14 | 82 | 102 | 106 | 112 | 97 | 88 | 93 | 94 | 97 | 99 |
| 15 | 76 | 98 | 96 | 75 | 89 | 96 | 98 | 108 | 75 | 92 |
| 16 | 78 | 110 | 100 | 101 | 98 | 108 | 104 | 110 | 93 | 103 |
| 17 | 79 | 99 | 98 | 94 | 97 | 87 | 101 | 81 | 95 | 94 |
| 18 | 70 | 89 | 96 | 85 | 77 | 80 | 85 | 88 | 72 | 84 |
| 19 | 76 | 89 | 88 | 86 | 92 | 87 | 85 | 72 | 83 | 86 |
| 20 | 82 | 103 | 96 | 102 | 86 | 95 | 91 | 69 | 83 | 82 |
| 21 | 77 | 83 | 95 | 88 | 82 | 85 | 76 | 66 | 83 | 82 |
| 22 | 73 | 98 | 94 | 84 | 89 | 68 | 71 | 70 |  | 82 |
| 23 | 70 | 80 | 70 | 78 | 66 | 78 | 76 | 70 | 74 | 74 |
| 24 | 72 | 89 | 98 | 81 | 83 | 71 | 66 | 64 |  | 79 |
| 25 | 74 | 86 | 96 | 86 | 94 | 81 | 76 | 68 | 58 | 81 |

By reference to Table II, it will be noted that, when fiber filters of the type employed on "Pall Mall Filter 100's" were removed, the pressure drop was lowered from a level of between about 140 mm.–160 mm. of water to a level of from about 80 mm.–100 mm. of water. Roughly, the presence of the ordinary cellulose fiber filters therefore adds about 60 mm. additional pressure drop to the cigarette itself.

TABLE III

"Pall Mall Filter 100" Cigarettes As Purchased but with Original Filters Cut Off and Radial Flow, 15 mm. 200 Mesh Carbon Filters of the Invention Substituted for the Original Filters

| Unit Number | Unlit | 1 | 2 | 3 | 4 | 5 | 6 | 7 | Average |
|---|---|---|---|---|---|---|---|---|---|
| 1 | 96 | 119 | 144 | 141 | 125 | 122 | 148 | 128 | 139 |
| 2 | 128 | 148 | 152 | 153 | 150 | 152 | 157 | 148 | 153 |
| 3 | 96 | 119 | 129 | 141 | 138 | 131 | 117 |  | 122 |
| 4 | 88 | 108 | 114 | 124 | 138 | 120 | 108 |  | 119 |
| Average | 102 |  |  |  |  |  |  |  | 131 |

Table III summarizes results obtained when using the same "Pall Mall Filter 100" Cigarettes referred to in Tables I and II, with the filters thereof cut off and with the radial flow filters of the invention substituted therefor. On the average, the total pressure drop was then only about 130 mm. Thus, reduction of pressure drop averaged about 30 mm. or more, as noted. As pointed out above, the quality of filtration was far superior to that of the Pall Mall 100 cigarettes with the original filters, since an active material was used in the filter body and it was very finely subdivided. The particular filter bodies referred to in Table III were 70 mm. in outside diameter, 3.5 mm. inside diameter, and 15 mm. length. Their physical and chemical makeup was that of Example 1.

TABLE IV

Same as Table III but with 9.55 mm., 200 Mesh Carbon Axial Flow Filters Substituted for Original Filters

| Unit Number | Unlit | 1 | 2 | 3 | 4 | 5 | 6 | 7 | 8 | Average |
|---|---|---|---|---|---|---|---|---|---|---|
| 1 | 490 | 512 | 522 | 522 | 522 | 522 | 522 | 518 | 518 | 520 |
| 2 | 484 | 491 | 496 | 496 | 496 | 496 | 496 | 496 | 500 | 496 |
| 3 | 432 | 433 | 440 | 441 | 441 | 441 | 441 | 440 | 450 | 441 |
| 4 | 436 | 434 | 440 | 441 | 442 | 442 | 442 | 446 | 450 | 442 |
| 5 | 440 | 459 | 466 | 465 | 465 | 464 | 464 | 467 | 475 | 466 |
| Average | 456 |  |  |  |  |  |  |  |  | 473 |

Accordingly, it will be seen from Table IV that with substantially the same volume, or even a lesser volume of active aggregate material of the same mesh, as that used in preparing the filter bodies of Table III, the solid cylindrical axial flow filters, when used with a cigarette, raised the pressure drop to an average of 473 mm., which was totally unacceptable. The filter action of these filters was excellent, however, as expected, and the only drawback to using these filters was that the pressure drop thereof was extremely high.

TABLE V

Same as Tables III and IV but with 15 mm. 200 Mesh Carbon Axial Flow Filters Used in Place of the Original Filters

| Unit Number | Unlit | 1 | 2 | 3 | 4 | 5 | 6 | 7 | 8 | Average |
|---|---|---|---|---|---|---|---|---|---|---|
| 1 | 565 | 580 | 582 | 582 | 588 | 584 | 583 | 583 | 588 | 582 |
| 2 | 570 | 571 | 573 | 577 | 576 | 576 | 577 | 576 | 580 | 576 |
| 3 | 555 | 555 | 565 | 570 | 570 | 570 | 571 | 573 | 580 | 569 |
| 4 | 569 | 572 | 575 | 575 | 576 | 577 | 578 | 578 | 579 | 576 |
| 5 | 539 | 528 | 525 | 525 | 523 | 525 | 526 | 526 | 530 | 526 |
| Average | 560 |  |  |  |  |  |  |  |  | 566 |

From Table V it can be seen that, with the same particle size, same chemical composition, and a longer solid cylindrically shaped filter, the pressure drop was even higher, averaging 566 mm., a totally unacceptable pressure drop. However, because of the enhanced activity of the improved aggregate material, the filtration characteristics of the filters of Table V were also excellent; only the pressure drops rendered the filters unsatisfactory for use, thus pointing out the advantage of the large surface area—a small thickness concept exemplified by the radial flow filter, which combines outstanding filter activity with minimum pressure drop, while retaining compactness and ease of manufacture.

TABLE VI

"Lark Filter 100's" Pressure Drop (mm. H₂O) During Puff Number

| Cigarette Number | Unlit | 1 | 2 | 3 | 4 | 5 | 6 | 7 | 8 | 9 | 10 | Average |
|---|---|---|---|---|---|---|---|---|---|---|---|---|
| 1 | 144 | 152 | 160 | 157 | 157 | 150 | 158 | 152 | 149 | 146 | 149 | 153 |
| 2 | 134 | 150 | 152 | 145 | 145 | 142 | 140 | 137 | 135 | 132 | 135 | 141 |
| 3 | 140 | 155 | 150 | 155 | 153 | 152 | 160 | 142 | 145 | 140 | 160 | 151 |
| 4 | 148 | 163 | 170 | 162 | 151 | 154 | 152 | 151 | 158 | 147 | 155 | 156 |
| 5 | 119 | 135 | 136 | 133 | 130 | 135 | 130 | 128 | 140 | 147 | 153 | 137 |
| 6 | 129 | 142 | 150 | 149 | 142 | 142 | 131 | 132 | 146 | 139 | 128 | 140 |
| 7 | 132 | 150 | 148 | 141 | 132 | 137 | 139 | 137 | 132 | 135 | 126 | 138 |
| 8 | 134 | 159 | 159 | 159 | 151 | 150 | 165 | 150 | 144 | 153 | 157 | 155 |
| 9 | 120 | 140 | 140 | 140 | 150 | 142 | 142 | 143 | 148 | 141 | 139 | 143 |
| 10 | 155 | 168 | 170 | 169 | 169 | 172 | 168 | 164 | 172 | 170 | 175 | 170 |
| 11 | 138 | 159 | 158 | 160 | 160 | 170 | 162 | 159 | 156 | 164 | 154 | 160 |
| 12 | 139 | 170 | 168 | 171 | 168 | 152 | 169 | 143 | 143 | 153 | 156 | 159 |
| 13 | 138 | 159 | 163 | 151 | 154 | 152 | 152 | 155 | 167 | 162 | 152 | 157 |
| 14 | 134 | 155 | 151 | 141 | 145 | 147 | 141 | 150 | 139 | 159 | 149 | 148 |
| 15 | 143 | 159 | 157 | 144 | 149 | 144 | 145 | 140 | 142 | 149 | 149 | 148 |
| 16 | 130 | 151 | 143 | 143 | 142 | 138 | 142 | 132 | 139 | 145 | 146 | 142 |
| 17 | 150 | 150 | 158 | 160 | 154 | 152 | 150 | 160 | 153 | 150 | 151 | 155 |
| 18 | 119 | 145 | 152 | 152 | 158 | 150 | 132 | 136 | 135 | 142 | 145 | 145 |
| 19 | 120 | 155 | 154 | 156 | 149 | 162 | 161 | 152 | 147 | 140 | 144 | 152 |
| 20 | 134 | 161 | 170 | 170 | 165 | 168 | 171 | 180 | 168 | 172 | 164 | 168 |
| 21 | 134 | 170 | 169 | 161 | 160 | 162 | 162 | 163 | 159 | 159 | 159 | 162 |
| 22 | 152 | 172 | 182 | 179 | 176 | 168 | 169 | 173 | 162 | 162 | 160 | 170 |
| 23 | 140 | 150 | 167 | 159 | 162 | 157 | 164 | 160 | 163 | 160 | 160 | 169 |
| 24 | 138 | 159 | 169 | 166 | 169 | 158 | 162 | 151 | 154 | 160 | 151 | 160 |
| 25 | 130 | 140 | 152 | 161 | 156 | 159 | 153 | 154 | 155 | 156 | 161 | 155 |

The "Lark Filter 100" cigarettes of Table VI were purchased on the open market and were of the so-called 100 mm. length. The filter included a 20 x 40 mesh activated carbon loose particle element between two fiber elements, and was otherwise of conventional construction. Twenty-five cigarettes were tested, first as to pressure drop with the cigarette unlit, and thereafter as each puff was taken. In the table, the consecutive values read from the manometer are arranged from left to right. The average pressure drop for each sample is set forth in the extreme right hand column. The "Lark" cigarettes varied considerably in pressure drop among samples.

TABLE VII

Pressure Drop, "Lark Filter 100's" as Purchased But with Filters Cut Off

| Cigarette Number | Unlit | 1 | 2 | 3 | 4 | 5 | 6 | 7 | 8 | Average |
|---|---|---|---|---|---|---|---|---|---|---|
| 1 | 71 | 92 | 109 | 114 | 92 | 100 | 100 | 80 | 71 | 95 |
| 2 | 68 | 73 | 114 | 101 | 103 | 104 | 92 | 102 | 83 | 97 |
| 3 | 67 | 78 | 88 | 105 | 84 | 111 | 101 | 89 | 76 | 92 |
| 4 | 51 | 69 | 84 | 82 | 105 | 94 | 93 | 81 | | 87 |
| 5 | 77 | 94 | 109 | 104 | 100 | 119 | 109 | 107 | 111 | 107 |
| 6 | 69 | 95 | 102 | 108 | 101 | 92 | 90 | 82 | 110 | 98 |
| 7 | 70 | 95 | 78 | 91 | 96 | 85 | 116 | 117 | 86 | 91 |
| 8 | 64 | 76 | 92 | 100 | 100 | 92 | 92 | 97 | 80 | 91 |
| 9 | 55 | 79 | 79 | 76 | 73 | 65 | 69 | 80 | | 73 |
| 10 | 72 | 94 | 96 | 102 | 105 | 106 | 100 | 82 | 95 | 98 |
| 11 | 70 | 79 | 99 | 91 | 90 | 88 | 100 | 76 | | 89 |
| 12 | 81 | 99 | 104 | 102 | 104 | 120 | 125 | 91 | 94 | 105 |
| 13 | 69 | 90 | 98 | 104 | 90 | 89 | 93 | 80 | | 92 |
| 14 | 72 | 85 | 108 | 97 | 90 | 97 | 78 | 82 | 80 | 90 |
| 15 | 82 | 109 | 120 | 117 | 120 | 111 | 100 | 99 | 100 | 110 |
| 16 | 80 | 96 | 102 | 130 | 107 | 98 | 88 | 86 | 88 | 99 |
| 17 | 72 | 98 | 94 | 100 | 92 | 102 | 99 | 93 | 89 | 96 |
| 18 | 82 | 98 | 106 | 98 | 107 | 107 | 95 | 82 | 81 | 97 |
| 19 | 86 | 123 | 129 | 125 | 119 | 109 | 109 | 105 | 115 | 117 |
| 20 | 71 | 79 | 92 | 98 | 91 | 96 | 98 | 92 | 110 | 95 |
| 21 | 71 | 92 | 92 | 98 | 96 | 94 | 81 | 90 | 82 | 91 |
| 22 | 71 | 104 | 94 | 93 | 81 | 84 | 112 | 80 | | 93 |
| 23 | 77 | 101 | 110 | 105 | 97 | 91 | 75 | 76 | 69 | 91 |
| 24 | 59 | 72 | 92 | 69 | 72 | 78 | 80 | 65 | | 75 |
| 25 | 79 | 104 | 112 | 122 | 116 | 96 | 119 | 112 | 91 | 109 |

By reference to Table VII it will be noted that, when fiber filters of the type employed on "Lark Filter 100's" were removed, the pressure drop was lowered from a level of between about 140 mm.–170 mm. of water to a level of from about 90 mm.–110 mm. of water. Roughly, the presence of the composite cellulose fiber-activated carbon filter therefore adds about 55–60 mm. additional pressure drop to the cigarette itself.

TABLE VIII

"Lark Filter 100" Cigarettes as Purchased but with Original Filters Cut Off and Radial Flow, 15 mm. 200 Mesh Carbon Filters of the Invention Substituted for the Original Filters

| Unit Number | Unlit | 1 | 2 | 3 | 4 | 5 | 6 | 7 | Average |
|---|---|---|---|---|---|---|---|---|---|
| 1 | 80 | 86 | 90 | 90 | 92 | 90 | 92 | 92 | 90 |
| 2 | 87 | 95 | 112 | 128 | 122 | 120 | 116 | 109 | 115 |
| 3 | 110 | 139 | 133 | 133 | 138 | 142 | 149 | 160 | 142 |
| 4 | 128 | 129 | 142 | 152 | 151 | 153 | 144 | 150 | 146 |
| Average | 101 | | | | | | | | 123 |

Table VIII summarizes results obtained when using the same "Lark Filter 100" cigarettes referred to in Tables VI or VII, with the filters thereof cut off and with the radial flow filters of the invention substituted therefor. On the average, the total pressure drop was then only about 120 mm. Thus, reduction of pressure drop averaged about 40 mm. or more, as noted. As pointed out above, the quality of filtration was far superior to that of the Lark 100 cigarettes with the original filters, since an active material was used in the filter body and it was very finely subdivided. The particular filter bodies referred to in Table VIII were 7.0 mm. in outside diameter, 3.5 mm. inside diameter, and 15 mm. length. Their physical and chemical makeup was that of Example 1.

TABLE IX

Same as Table VIII but with 9.55 mm., 200 Mesh Carbon Axial Flow Filters Substituted for Original Filters

| Unit Number | Unlit | 1 | 2 | 3 | 4 | 5 | 6 | 7 | 8 | Average |
|---|---|---|---|---|---|---|---|---|---|---|
| 1 | 492 | 493 | 495 | 494 | 492 | 489 | 488 | 488 | 489 | 491 |
| 2 | 470 | 472 | 476 | 477 | 476 | 478 | 476 | 480 | 480 | 477 |
| 3 | 412 | 402 | 408 | 408 | 407 | 407 | 400 | 402 | 409 | 405 |
| 4 | 530 | 356 | 550 | 552 | 554 | 555 | 554 | 555 | 559 | 552 |
| 5 | 428 | 429 | 438 | 440 | 440 | 440 | 442 | 442 | 444 | 439 |
| Average | 466 | | | | | | | | | 473 |

Accordingly, it will be seen from Table IX that with substantially the same volume, or even a lesser volume of active aggregate material of the same mesh, as that used in preparing the filter bodies of Table VIII, the solid cylindrical axial flow filters, when used with a cigarette, raised the pressure drop to an average of 473 mm., which was totally unacceptable. The filter action of these filters was excellent, however, as expected, and the only drawback to using these filters was that the pressure drop thereof was extremely high.

TABLE X

Same as Tables VII and IX but with 15 mm., 200 Mesh Carbon Axial Flow Filters Used in Place of the Original Filters

| Unit Number | Unlit | 1 | 2 | 3 | 4 | 5 | 6 | 7 | 8 | Average |
|---|---|---|---|---|---|---|---|---|---|---|
| 1 | 537 | 531 | 544 | 546 | 548 | 550 | 548 | 548 | 552 | 546 |
| 2 | 552 | 550 | 562 | 570 | 571 | 569 | 570 | 568 | 569 | 566 |
| 3 | 565 | 558 | 570 | 573 | 575 | 575 | 575 | 575 | 577 | 572 |
| 4 | 570 | 568 | 577 | 576 | 577 | 574 | 576 | 575 | 575 | 575 |
| 5 | 567 | 558 | 572 | 576 | 578 | 580 | 584 | 583 | 589 | 578 |
| Average | 558 | | | | | | | | | 567 |

From Table X it can be seen that, with the same particle size, same chemical composition, and a longer solid cylindrically shaped filter, the pressure drop was even higher, averaging 567 mm., a totally unacceptable pressure drop. However, because of the enhanced activity of the improved aggregate material, the filtration characteristics of the filters of Table X were also excellent; only the pressure drops rendered the filters unsatisfactory for use, thus pointing out the advantage of the large surface area—small thickness concept exemplified by the radial flow filter, which combines outstanding filter activity with minimal pressure drop, while retaining compact physical size and ease of manufacture.

A still further advantage of the filter construction of the invention is that, for reasons which are not fully understood, a significant amount of moisture and tar precipitation occurs on the walls of the chamber which is principally defined by the inner surface of the mouthpiece sleeve and the outer surface of the filter body. After the cigarette has been smoked, if the mouthpiece sleeve is either opened or removed, it will be seen that there is a heavy concentration of moisture and tar in these areas. This appears to provide an additional capability for tar removal over and above that provided by the basic filter construction itself. It is not known with certainty whether the moisture initially condenses and is then able to trap soluble tars therein, whether cooling occurs because of volume change or pressure drop in the smoke stream or the like, or whether the moisture is formed separately from the tars or not. It is also thought possible, but not established, that the directional change in the stream flow accounts for a part of this phenomenon. However, the effect is advantageous and is of common occurrence during the tests. In the prior art, slightly porous or perforated mouthpiece sleeves have been provided with a view toward causing moisture and tar precipitation from the smoke stream. The present invention appears operative both with sleeves having some porosity as well as with smoke-impermeable mouthpiece sleeves. The only apparent limit to sleeve permeability is that the sleeve must be sufficiently impermeable so as to permit, at most, only small air flow therethrough in relation to the total amount of smoke drawn through the filter.

Another aspect of the present invention, the cause of which is not understood with certainty is the apparent lack of adhesion between the binder strands or fibers which are formed in place and the surface of the aggregate particles. Howeevr, since it is known that water reacts with the urethane prepolymers to form carbon dioxide, and since in many of the above examples, the aggregate particles are wet thoroughly before the binder is mixed with the aggregate, it is thought possible that the gas formed by the reaction is generated at the particle surface where the water is situated and therefore, gas generation at this interface may serve to prevent contact and subsequent adhesion between the strands or fibers and the aggregate particles.

By reference to the test data set forth in Tables I–X, by reference to Examples 1–15, and by reference to the remainder of the specification, it will be noted that there are some differences in filter dimensions. It should be understood that although tests were made in different manners, and with different sizes and shapes of filters, the test data reproduced in the tables are those arrived at by an independent testing laboratory, whereas some of the other test results referred to in less detail throughout the specification were based on tests performed on other sizes and shapes of filter bodies. Likewise, the references in the specification to certain filter volumes are set forth only for comparison purposes and are not necessarily based on the data summarized in tabular form. Accordingly, it is not intended to be implied that the tests specifically set forth in detail were the only tests performed on the cigarette filters of the invention, or that the forms, shapes or dimensions tested are necessarily critical to the practice of the invention. As an example, however, it was discovered that it was possible, while retaining a satisfactory pressure drop, to remove all visible particles from smoke by selecting appropriate materials in finely divided forms, or other filter materials.

Figure 10:
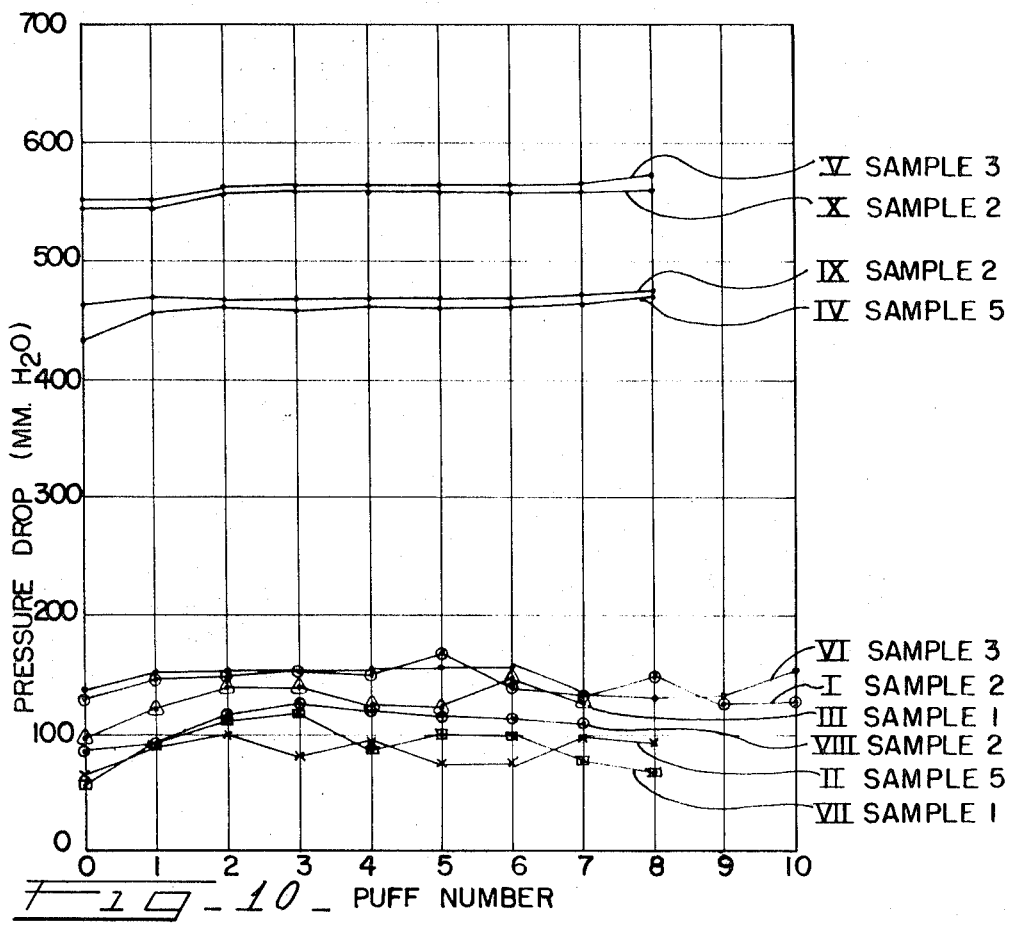
FIG. 10 is a graph showing the results of the tests obtained with the apparatus of FIG. 9.

Referring now to FIG. 10, a graph is shown in which the pressure drop appears as the vertical element or the ordinate of the graph and the horizontal element or abscissa shows the number of consecutive puffs taken, starting with an unlit cigarette at the left and continuing to the right until the last puff is taken. The ten different curves are identified by the same Roman Numerals by which each table which was the source of the data was identified in the specification.

Curves II and VII thus show the lowest pressure drop, since these readings were taken on cigarettes having no filters. Curves III and VIII show the next lowest set of values, and these curves indicate the pressure drops across Pall Mall and Lark cigarettes, respectively, when a preferred filter of the invention is associated with the cigarettes. It will be noted that these curves are the lowest for any curve representing pressure drop in a cigarette with a filter attached. Curves I and VI are higher than curves III and VIII, since these curves represent the pressure drops across Pall Mall and Lark cigarettes, respectively, as purchased. Curves IV and IX show the pressure drops across Pall Mall and Lark cigarettes, respectively, when axial flow filters having bodies made accordingly to the invention were associated with the cigarettes. These filters gave excellent filtration, substantially equal to that of the filters of curves III and VIII, but exhibited much higher pressure drop.

Curves V and X are similar to curves IV and IX, except that the filters associated with these cigarettes were of a 15 mm. length instead of a 9.5 mm. length. As expected, these filters provided excellent filtration, substantially equal to that provided by the filters of curves III, IV, VIII and IX, but exhibited a pressure drop greater than that exhibited by the cigarettes of curves IV and IX, and much greater than that exhibited by the cigarettes of curves III and VIII.

Since it is not believed necessary to recapitulate all the tabulated test data in graphic form, and since the curves shown in the graph which is the subject of FIG. 10 are intended merely to illustrate the advantages of the present invention, only one set of pressure drop readings was selected from each table. In selecting the particular set of readings plotted, an attempt was made to find a sample having performance most nearly approximating the average performance of all samples whose performance was summarized in each table.

In keeping with the above, curve I is based on Sample No. 11, Table I; curve II is a plot of the values obtained with Sample No. 5, Table II; curve III is based on Sample No. 1, Table III; and curve IV is based on Sample No. 5, Table IV. Curve V is based on Sample No. 3 of Table V; curve VI reflects the data obtained from Sample No. 3 of Table VI; curve VII is based on Sample No. 1 of Table VII; and curve VIII is based on Sample No. 2 of Table VIII. Curve IX shows the data taken from Sample No. 2 of Table IX; and curve X is based on Sample No. 2 of Table X.

From this graph, it is easy to visualize the advantages of the novel cigarette filter of the invention since it clearly appears that the larger surface area-short flow path filters of the invention, which feature very low pressure drop in spite of possessing extremely fine particle size, provide a desirable construction with greatly increased filtration effectiveness. As pointed out above, the fact that different materials, including combinations of materials, may be used as the aggregate affords great latitude for the filter designer to provide an aggregate which is suited to remove exact constituents of smoke desired to be removed therefrom. In fact, in one test, a filter having an outer sleeve and an inner element of a fiberglass mat material arranged for radial flow was able to remove all visible components from cigarette smoke with a pressure drop, which was equal to or less than that across a conventional filter.

Reference will now be made to various other forms of the invention, wherein the filter body is arranged so as to provide the advantages of the invention. Thus, referring to FIG. 11, it can be seen that a filter cigarette 10 has a mouthpiece in the form of a sleeve 26 which is of the same diameter as the outer paper sleeve 18 of the cigarette. However, in this embodiment, the filter body 28 is of substantially enlarged diameter in relation to the diameter of the sleeves 18, 26. Accordingly, the inlet surface 30 of the filter body 28 is large in respect to the cross-sectional area of the cigarette body 12, while the section through which the smoke passes is relatively thin. In this construction, the downstream or outlet area 32 is also substantially larger than the area of the cigarette body 12. In the embodiment illustrated, the filter assembly 14 forms a part of the cigarette 10. However, in those cases in which the body 28 is of this configuration, and particularly if it were to be made even larger and thinner, the filter assembly might advantageously be used as a cigarette or cigar holder rather than being integrally formed with the cigarette body 12. Likewise, baffles or channels (not shown) might be provided to direct the smoke somewhat equally to all parts of the inlet surface 30.

Referring now to FIGS. 12 and 13, the invention is shown to be embodied in a filter cigarette 10 having a cigarette body portion 12, and prefilter 24 and a generally longitudinally extending filter body 28 held within the mouthpiece sleeve 26. In this construction, the body 28 is supported by the rear end seal unit 40 and the semicircular disc 52 which covers the front end of the filter body 28. By reason of this arrangement, a large area inlet surface 30 in relation to the cross-sectional area of the core 16 of the cigarette body 12 is provided. Accordingly, flow of smoke is of generally radial pattern, and at any rate is transverse to the thin dimension of the filter body 28.

Referring now to FIGS. 14 and 15, a construction is illustrated wherein the cigarette 10 also includes the prefilter 24 lying to the rear of the cigarette body 12, but in which the filter body is subdivided into a plurality of body elements 28a, 28b, 28c, 28d, 28e, each having inlet surfaces 30a, 30b, and outlet surfaces 32a, 32b, etc. associated therewith. A plurality of baffles 150 are provided to insure that the flow of the smoke is through a thin section of the body elements 28a, 28b, etc. By reason of the subdivision of the body into the elements 28a, 28b, etc. the cumulative inlet surface area is large in relation to the cross-sectional area of the cigarette body 12. A rear end seal unit 40 and a counterpart thereof in the form of a support 52a for the front element 28a are provided to locate the segmented body within the mouthpiece sleeve 26.

Figure 16:
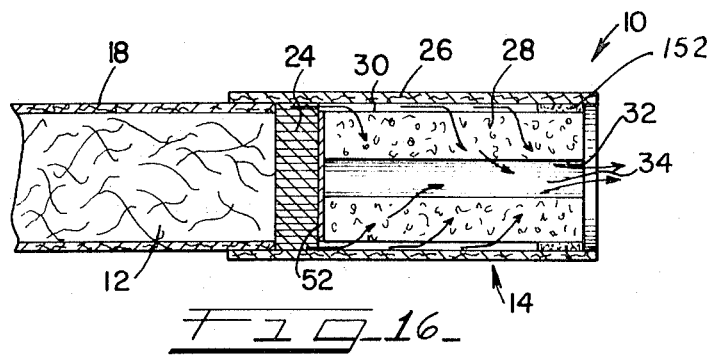
FIG. 16 is a vertical sectional view through another form of cigarette filter, made according to the invention.

Referring now to FIG. 16, a construction is shown which includes the prefilter 24, and the hollow cylindrical filter body 28 having a flat circular disc 52 covering the front face portion thereof. In this construction, however a rear end seal unit is not provided in the form of a disc, but a layer of adhesive 152 is provided to insure that smoke flow is from the outer surface 30 to the bore 34 lying centrally of the body 28 or in the alternative, that at least a portion of the body 28 of the filter unit 14 must be traversed by the smoke before it can escape the filter assembly 14.

Figure 17:
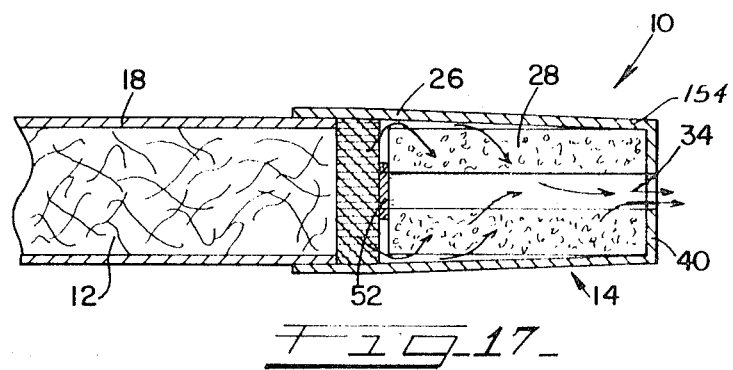
FIG. 17 is a vertical sectional view through a modified form of a cigarette filter, made according to the invention.

FIG. 17 shows an embodiment of the invention in which the filter body 28 is of a cylindrical configuration but is wedged into the rear end portion 154 of the mouthpiece sleeve 26, and in which the end seal unit 40 is integrally formed with the mouthpiece sleeve 26.

Figure 18:
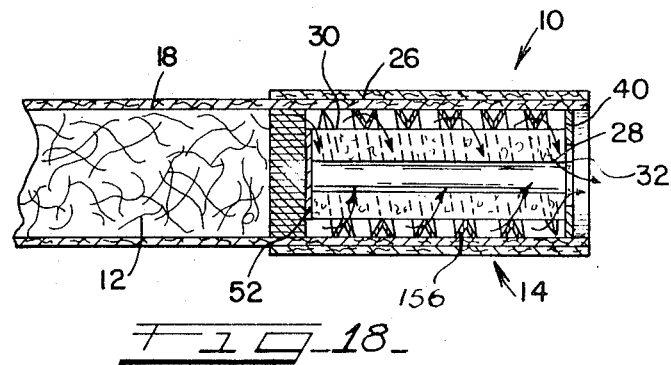
FIG. 18 is a vertical sectional view through still another form of cigarette filter, made according to the invention; and, FIG. 19 is a vertical sectional view through another form of cigarette filter, made according to the invention.

FIG. 18 shows a filter cigarette 10 having the filter body 28 thereof closed off at the front by a disc 52 and partially closed at the rear by an end seal unit 40. Smoke flow is directed to the outer surface 30 of the body 28 by means of the helical baffle 156, which also serves to locate the body 28 inside the mouthpiece sleeve 26.

Figure 19:
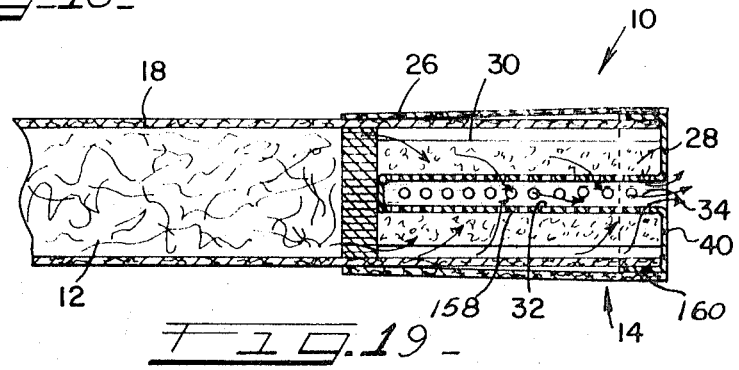

FIG. 19 shows an embodiment of the invention in which a foraminous tube assembly 158 extending along the outlet surface 32 of the filter body 28 is provided to locate the body 28 in place. In this embodiment, the mouthpiece sleeve 26 covers a flange 160 of the tube assembly 158, and flange 160 is joined to the major portion thereof by the end seal unit 40 which is integrally formed therewith. This construction insures that smoke flow will be of a generally radial pattern from the large surface area inlet portion 30 of the body 28, in keeping with the objects of the invention. From the variety of illustrated embodiments it will be clear that a number of other forms of filter assemblies utilizing the principle of the present invention might be constructed.

We claim:

1. A filter assembly for a smokeable article, said assembly comprising a filter body portion including a plurality of finely divided surface active aggregate particles in substantially abutting relationship to each other in substantially the same manner as said aggregate particles would be distributed in a loose bed, said particles being fixed in relation to one another by a matrix having a volume which is substantially less than the interstitial volume of said body, said matrix consisting essentially of a cured resinous polymeric material formed from liquid reactants selected from the class consisting of polyurethane resin systems, epoxy foamable two-component resin systems, and polyvinyl formal polymeric systems, said matrix having been formed from a reacted polymer mass characterized by relatively little bubble formation, said particles having a principal portion of their entire surface areas freely exposed for contacting smoke passing through said filter body, said filter body having, in respect to smoke flowing therethrough, a surface facing upstream and a surface facing downstream, said surface facing upstream defining an entry region having an area which is substantially larger than the cross-sectional area of the smokeable article with which said filter is associated in use.

2. A filter assembly as defined in claim 1 wherein said filter body includes a radially outer annular surface, and a radially inner annular surface defining an axially extending re-entrant lying at least partially radially inwardly of said outer surface, the opening of said re-entrant lying to the rear of said body.

3. A filter assembly as defined in claim 1 in which said filter body is in the shape of a cylindrical sleeve.

4. A filter assembly as defined in claim 1 in which said filter body is in the form of a cone having an inwardly facing surface defining a hollow inner core therein, one margin of said surface defining a rearwardly facing opening for allowing smoke to escape therethrough.

5. A filter assembly as defined in claim 1 in which said filter assembly includes an outer mouthpiece portion, said filter body being disposed at least partially within said mouthpiece portion, the outer surface of said body being spaced radially inwardly apart from the inside surface of said mouthpiece portion, said filter body also including an at least partially radially inwardly facing annular surface defining a hollow central core for receiving smoke passing through said filter body, said surface defining said core having a margin thereof defining an opening facing to the rear for discharge of filtered smoke therethrough.

6. A filter assembly as defined in claim 1 in which said matrix comprises from about 1½% to about up to 40%, by weight, of the total weight of said filter body.

7. A filter assembly as defined in claim 1 in which said matrix is present in an amount of from about 5% to about 10%, by weight, of the total weight of said filter body.

8. A filter assembly as defined in claim 1 in which said matrix comprises a resinous material from the class consisting of polyether-containing materials, polyester-containing materials and polyamine-containing materials.

9. A filter assembly as defined in claim 1 in which said matrix is a synthetic resinous material formed from a polyurethane prepolymer.

10. A filter assembly as defined in claim 1 in which said active aggregate particles in said filter body are activated carbon.

11. A filter assembly as defined in claim 1 in which said active aggregate particles are ion exchange resin particles.

12. A filter assembly as defined in claim 1 in which said active aggregate particles comprising mixture of an activated carbon material and an ion exchange resin material.

13. A filter assembly as defined in claim 10 in which the particle size of substantially all of said aggregate particles is no larger than 100 mesh size.

14. A filter assembly as defined in claim 11 in which the particle size of substantially all of said aggregrate particles is no larger than 100 mesh size.

15. A filter assembly as defined in claim 12 in which the particle size of substantially all of said materials is a particle size no larger than 100 mesh.

16. A filter assembly as defined in claim 1 in which said filter body further includes an integral portion forming means thereon extending outwardly from the remainder of the outer surface of said body for engaging an inwardly facing portion of an associated mouthpiece sleeve for spacing said body apart from said sleeve.

17. A filter assembly as defined in claim 5 in which said filter body is cylindrical and in which said core is in the form of a cylindrical bore extending entirely through said cylindrical body, said body including means covering at least a part of one end portion of said body, to prevent smoke flow therethrough, and in which means are provided at the opposite end of said filter body for closing off said opposite end portion of said body against smoke flow therethrough.

18. A filter assembly as defined in claim 5 in which said outer mouthpiece portion has means associated therewith which extend inwardly from the inner surface of said mouthpiece portion for contact with said outer surface portion of said filter body to maintain said filter body and said sleeve in a spaced apart relation.

19. A filter assembly as defined in claim 18 in which said means associated with said mouthpiece portion comprises a ring of a corrugated paper material, the corrugations extending inwardly therefrom and being adapted to contact said outer surface portion of said filter body.

20. The filter assembly of claim 1 wherein said polymeric material is formed from a polyurethane resin system.

21. A filter assembly for a smokeable article, said assembly comprising, in combination, a radially outer sleeve portion, a filter body portion disposed within said sleeve portion and being spaced radially inwardly apart therefrom, said filter body including a plurality of finely divided surface active aggregate particles in substantially abutting relationship to each other in substantially the same manner as said particles would be distributed in a loose bed, said particles being fixed in relation to one another by a matrix having a volume which is substantially less than the interstitial volume of said body, said matrix consisting essentially of a cured resinous polymeric material formed from liquid reactants selected from the class consisting of polyurethane resin systems, epoxy foamable two-component resin systems, and polyvinyl formal polymeric systems, said matrix having been formed from a reacted polymer mass characterized by relatively little bubble formation, said particles having a principal portion of their entire surface areas freely exposed for contacting smoke passing through said filter body, said filter body having, in respect to smoke flowing therethrough, a surface facing upstream and a surface facing downstream, said surface facing upstream defining an entry region having an area which is substantially larger than the cross-sectional area of the smokeable article with which said filter is associated in use.

22. A filter assembly as defined in claim 21 in which means are provided for closing off at least a portion of each axial end of said filter body to prevent smoke flow through said filter body in the vicinity of said means.

23. The filter assembly of claim 21 wherein said polymeric material is formed from a polyurethane resin system.

24. A cigarette comprising: tobacco, a wrapper, and a filter integral with said cigarette; said filter including a radially outer sleeve portion, said sleeve portion being smoke impermeable and joined to said wrapper; a filter body disposed within said sleeve portion and spaced radially inwardly apart therefrom, said filter body being an integral structure consisting of a bed of closely spaced finely divided surface active aggregate particles which are distributed throughout said bed in substantially the same manner as said particles would be distributed in a loose bed and binding means for maintaining said aggregate particles as a self-supporting bed, said binding means consisting essentially of strand-like members of a cured resinous polymeric material formed from liquid reactants selected from the class consisting of polyurethane resin systems, epoxy foamable two-component resin systems, and polyvinyl formal polymeric systems, said matrix having been formed from a reacted polymer mass characterized by relatively little bubble formation and having a volume less than the interstitial volume between said closely packed finely divided surface active aggregate particles to expose a principal portion of the surface areas of said particles to tobacco smoke, said filter body having, with respect to smoke flowing therethrough, a surface facing upstream and a surface facing downstream, said surface facing upstream defining an entry region having an area which is substantially larger than the cross-sectional area of the cigarette; and baffle means for directing all the smoke from said cigarette radially through said bed.

25. The improvement of claim 24 wherein said bed is in the shape of a cylindrical sleeve.

26. The improvement of claim 24 wherein said bed is in the shape of a hollow cone.

27. The filter assembly of claim 24 wherein said polymeric material is formed from a polyurethane resin system.

28. A cigarette and filter assembly comprising, in combination, a cigarette, an outer generally cylindrical sleeve mounted to one end of said cigarette and having a cross-sectional configuration which is substantially the same as the cigarette to which said filter is mounted, said filter including a filter body unit having an exterior, generally radially outwardly facing, circumferentially extending outer filter body surface portion and a generally radially inwardly facing, circumferentially extending inner filter body surface portion defining a re-entrant opening in said body, the inner surface portion of said sleeve and said outer filter body surface portion defining therebetween a generally axially extending smoke-receiving chamber, means associated with the forward portion of said filter body to prevent generally axially directed smoke therethrough, and means associated with the opposite axial end of said filter body lying radially about, and outwardly of, a rear margin of said re-entrant opening to prevent generally axially directed smoke flow therethrough, said filter body unit including a plurality of finely divided surface active aggregate particles in substantially abutting relationship to each other in substantially the same manner as said aggregate particles would be distributed in a loose bed, said particles being fixed in relation to one another by a matrix having a volume which is substantially less that the intersititial volume of said body, said matrix consisting essentially of a cured resinous polymeric material formed from reactants selected from the class consisting of polyurethane resin systems, epoxy foamable two-component resin systems, and polyvinyl formal polymeric systems, said matrix having been formed from a reacted polymer mass characterized by relatively little bubble formation, said particles having a principal portion of their entire surface area freely exposed for contacting smoke passing through said filter body, whereby, in the use of said filter, smoke to be filtered will generally pass axially into said chamber and generally radially inwardly through said filter body to said re-entrant opening for passage outwardly therefrom to the rear of said filter.

29. A cigarette filter assembly as defined in claim 28 in which said inner and outer filter body surfaces have corresponding parts thereof generally parallel to each other, and in which both of said surfaces are conical and are disposed with the apices thereof lying along a common line and facing forwardly.

30. A filter assembly as defined in claim 28 in which said filter body is in the form of a hollow cylindrical sleeve, and in which said body is surrounded by a helically extending baffle contacting said body along its outer surface to direct smoke around said body in a helical path.

References Cited

UNITED STATES PATENTS

| | | | |
|---|---|---|---|
| Re. 25,400 | 6/1963 | Doying | 252—428 |
| 3,248,339 | 4/1966 | Spes et al. | 252—426 |
| 3,251,365 | 5/1966 | Keith et al. | 131—10.7 |
| 3,256,218 | 6/1966 | Knox | 260—2.5 |
| 3,381,454 | 5/1968 | Sponsel | 55—528 |
| 3,387,940 | 6/1968 | McHenry et al. | 23—209.2 |
| 3,394,713 | 7/1968 | Thomson et al. | 131—261 B UX |
| 1,619,387 | 3/1927 | Waugh | 131—261 B UX |
| 2,126,422 | 8/1938 | Tarrant | 131—212 X |
| 2,768,754 | 10/1956 | Briggs | 210—496 |
| 2,770,241 | 11/1956 | Winkler | 131—269 X |
| 2,855,021 | 10/1958 | Hoppe | 260—2.5 |
| 2,975,488 | 3/1961 | Brauner | 264—45 |
| 3,024,207 | 3/1962 | Shaw et al. | 260—2.5 |

(Other references on following page)

UNITED STATES PATENTS

| | | | |
|---|---|---|---|
| 3,094,494 | 6/1963 | Hopkins et al. | 260—2.5 |
| 3,120,849 | 2/1964 | Guttag | 131—262 A X |
| 3,156,648 | 11/1964 | Brucken et al. | 210—209 |

FOREIGN PATENTS

| | | | |
|---|---|---|---|
| 1,118,860 | 3/1956 | France | 131—10.5 |
| 15,483 | 1895 | Great Britian | 131—261 B |

SAMUEL KOREN, Primary Examiner

G. M. YAHWAK, Assistant Examiner

U.S. Cl. X.R.

131—10.7, 262 A, 265, 267, 269

UNITED STATES PATENT OFFICE
CERTIFICATE OF CORRECTION

Patent No. 3,621,851          Dated November 23, 1971

Inventor(s) Don E. Heskett and John B. Heskett

It is certified that error appears in the above-identified patent and that said Letters Patent are hereby corrected as shown below:

Column 1, line 45, "manufacure" should be --manufacture--
Column 2, line 32, "while" should be --which--
Column 2, line 46, "are" should be --art--
Column 10, line 13, "cigarete" should be --cigarette--
Column 10, line 52, "17" should be --7--
Column 12, line 17, "descirbed" should be --described--
Column 12, line 38, "acutal" should be --actual--
Column 16, line 57, "exit" should be --exist--
Column 19, Table III, the numbers in the column entitled "Average" should read as follows:

>132
>151
>129
>119
>133

Column 22, line 72, "Howeevr" should read --However--

Signed and sealed this 20th day of June 1972.

(SEAL)
Attest:

EDWARD M. FLETCHER, JR.
Attesting Officer

ROBERT GOTTSCHALK
Commissioner of Patents